(12) United States Patent
Shim et al.

(10) Patent No.: US 7,294,088 B2
(45) Date of Patent: Nov. 13, 2007

(54) SIX-SPEED POWERTRAIN OF AN AUTOMATIC TRANSMISSION

(75) Inventors: Hyu Tae Shim, Hwaseong (KR); Ki Been Lim, Yongin (KR); Byeong Ho Soh, Hwaseong (KR); Kang Soo Seo, Suwon (KR)

(73) Assignee: Hyundai Motor Company, Seoul (KR)

( * ) Notice: Subject to any disclaimer, the term of this patent is extended or adjusted under 35 U.S.C. 154(b) by 183 days.

(21) Appl. No.: 11/270,257

(22) Filed: Nov. 9, 2005

(65) Prior Publication Data

US 2006/0100055 A1 May 11, 2006

(30) Foreign Application Priority Data

Nov. 9, 2004 (KR) .................. 10-2004-0090878

(51) Int. Cl.
*F16H 3/62* (2006.01)
(52) U.S. Cl. ....................................... 475/276
(58) Field of Classification Search ................. 475/276
See application file for complete search history.

(56) References Cited

U.S. PATENT DOCUMENTS

| 5,030,186 | A | * | 7/1991 | Asada ......................... 475/278 |
| 6,824,492 | B2 | * | 11/2004 | Tabata et al. ................ 475/276 |
| 7,048,669 | B2 | * | 5/2006 | Tabata et al. ................ 475/276 |
| 2006/0135309 | A1 | * | 6/2006 | Shim et al. .................. 475/278 |

FOREIGN PATENT DOCUMENTS

JP  2003-130149  5/2003

* cited by examiner

*Primary Examiner*—Dirk Wright
(74) *Attorney, Agent, or Firm*—Morgan Lewis & Bockius LLP

(57) ABSTRACT

A six-speed powertrain of an automatic transmission includes a first single pinion planetary gear set having a first sun gear, two first planet carriers, a first planetary gear, and a first ring gear. A second single pinion planetary gear set has a second sun gear, a second planetary gear, and a second ring gear. A double pinion planetary gear set has a third sun gear, a pair of third planetary gears, and a third ring gear. One planetary gear of the pair of third planetary gears and the second planetary gear are commonly connected by a common planet carrier such that the second and third planetary gears may independently rotate.

31 Claims, 14 Drawing Sheets

| operational element | CLUTCH | | BRAKE | | | OWC | gear ratio |
|---|---|---|---|---|---|---|---|
| | C1 | C2 | B1 | B2 | B3 | | |
| D 1st | | | (●) | ● | | ● | 4.642 |
| D 2nd | | | | ● | ● | | 2.797 |
| D 3rd | ● | | | ● | | | 1.805 |
| D 4th | | ● | | ● | | | 1.368 |
| D 5th | ● | ● | | | | | 1.000 |
| D 6th | | ● | | | ● | | 0.770 |
| R | ● | | ● | | | | 3.355 |

US 7,294,088 B2

SIX-SPEED POWERTRAIN OF AN AUTOMATIC TRANSMISSION

CROSS-REFERENCE TO RELATED APPLICATION

This application claims priority to and the benefit of Korean Patent Application No. 10-2004-0090878 filed in the Korean Intellectual Property Office on Nov. 9, 2004, the entire contents of which are incorporated herein by reference.

BACKGROUND OF THE INVENTION (a) Field of the Invention

The present invention relates to a six-speed powertrain of an automatic transmission of a vehicle installed in an automatic transmission and realizing six forward speeds and one reverse speed.

(b) Description of the Related Art

A multi-stage gearshift mechanism of an automatic transmission includes a plurality of planetary gear sets. A powertrain having such a plurality of planetary gears sets varies the torque in multi-stages and outputs it to an output shaft when receiving a converted engine torque from a torque converter.

The more speeds the powertrain of an automatic transmission has, the better the power performance and fuel consumption are. Therefore, it is desirable for powertrains to have as many speeds as possible.

Even for the same number of speeds, durability, power transmission efficiency, and size/weight of a transmission are substantially dependent on how planetary gear sets are arranged. Therefore, research for more structural strength, less power loss, and more compact packaging are continuously being conducted.

Usually, development of a powertrain using planetary gear sets does not devise a wholly new type of planetary gear set. To the contrary, it invokes how single/double pinion planetary gear sets are combined, and how clutches, brakes, and one-way clutches are disposed to the combination of Ravingneaux planetary gear sets such that required shift speeds and speed ratios are realized with minimal power loss.

For a manual transmission, too many speeds cause a driver the inconvenience of excessive manual shifting. However, for an automatic transmission, a transmission control unit automatically executes shifting by controlling the operation of the powertrain, and therefore, more speeds usually implies more merits.

Accordingly, research of four-speed and five-speed powertrains has been undertaken, and recently, a powertrain of an automatic transmission enabling six forward speeds and one reverse speed has been developed. However, current six-speed transmissions have a number of drawbacks including excessive size and weight and low durability.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention to provide a six-speed powertrain of an automatic transmission having advantages of minimizing a length and weight of the transmission. Therefore, according to the present invention, one planetary gear of a double pinion planetary gear set and a planetary gear of a single pinion planetary gear set are rotatably supported by one common planet carrier, and at least two ring gears are integrally formed, such that an axial supporting structure is excluded.

An exemplary six-speed powertrain of an automatic transmission according to an embodiment of the present invention includes first, second, and third planetary gear sets, an input shaft, and a transmission case, wherein a first single pinion planetary gear set has a first sun gear, two first planet carriers, a first planetary gear, and a first ring gear; a second single pinion planetary gear set has a second sun gear, a second planetary gear, and a second ring gear; a double pinion planetary gear set is disposed adjacent to the second single pinion planetary gear set and has a third sun gear, a pair of third planetary gears, and a third ring gear. Further, one planetary gear of the pair of third planetary gears and the second planetary gear may be commonly connected by a common planet carrier such that the second and third planetary gears may independently rotate, the third ring gear and the first ring gear may be fixedly connected such that they are integrally formed, the second ring gear and one first planet carrier are fixedly connected, and a torque of the input shaft is always transmitted to the second sun gear or the third sun gear.

The first sun gear may be variably connected with the input shaft via a clutch, the one first planet carrier and the second ring gear may be variably connected with the input shaft via a clutch, the other first planet carrier may be variably connected with the transmission case via a brake and a one-way clutch disposed in parallel, the third sun gear may be variably connected with the transmission case via a brake, the first sun gear may be variably connected with the transmission case via a brake, the second sun gear may be fixedly connected with the input shaft, and the third ring gear may be fixedly connected with the first ring gear and they may act as output elements. An output gear may be connected to the third ring gear acting as an output element. Also, an output gear may be connected to the first ring gear acting as an output element.

Alternatively, the first sun gear may be variably connected with the input shaft via a clutch, a second planet carrier may be additionally included in the second single pinion planetary gear set and be variably connected with the input shaft via a clutch, the other first planet carrier may be variably connected with the transmission case via a brake and a one way clutch disposed in parallel, the third sun gear may be variably connected with the transmission case via a brake, the first sun gear may be variably connected with the transmission case via a brake, the second sun gear may be fixedly connected with the input shaft, and the third ring gear may be fixedly connected with the first ring gear and they may act as output elements. The third ring gear acting as an output element may be connected with the output gear. Also, the first ring gear acting as an output element may be connected with the output gear.

Alternatively, the first sun gear may be variably connected with the input shaft via a clutch, the common planet carrier commonly connecting the second pinion planatery gear set and double pinion planetary gear set may be variably connected with the input shaft via a clutch, the other first planet carrier may be variably connected with the transmission case via a brake and a one-way clutch disposed in parallel, the third sun gear may be variably connected with the transmission case via a brake, the first sun gear may be variably connected with the transmission case via a brake, the second sun gear may be fixedly connected with the input shaft, and the third ring gear may be fixedly connected with the first ring gear and they may act as output elements. The third ring gear may be connected with the output gear and act as an output element. Also, the first ring gear may be connected with the output gear and act as an output element.

Further alternatively, the second sun gear may be variably connected with the input shaft via a clutch, a third planet carrier may be additionally included in the double pinion planetary gear set and may be variably connected with the input shaft via a clutch, the third planet carrier may also be variably connected with the transmission case via a brake and an one way clutch disposed in parallel, the first sun gear may be variably connected with the transmission case via a brake, the second sun gear may be variably connected with the transmission case via a brake, the third sun gear may be fixedly connected with the input shaft, and the other first planet carrier may act as an output element.

Alternatively, the second sun gear may be variably connected with the input shaft via a clutch, the common planet carrier may be variably connected with the input shaft via a clutch, a third planet carrier may additionally be included in the double pinion planetary gear set and may be variably connected with the transmission case via a brake and an one way clutch disposed in parallel, the first sun gear may be variably connected with the transmission case via a brake, the second sun gear may be variably connected with the transmission case via a brake, the third sun gear may be fixedly connected with the input shaft, and the other first planet carrier may act as an output element.

Still further alternatively, the second sun gear may be variably connected with the input shaft via a clutch, a third planet carrier may additionally be included in the double pinion planetary gear set and may be variably connected with the input shaft via a clutch, a second planet carrier may additionally be included in the second single pinion planetary gear set, separately formed from the second planetary gear, and may be variably connected with the transmission case via a brake and an one way clutch disposed in parallel, the first sun gear may be variably connected with the transmission case via a brake, the second sun gear may be variably connected with the transmission case via a brake, the third sun gear may be fixedly connected with the input shaft, and the other first planet carrier may act as an output element.

As another alternative, the second sun gear may be variably connected with the input shaft via a clutch, the third ring gear may be variably connected with the input shaft via a clutch, a second planet carrier may additionally be included in the second single pinion planetary gear set, separately formed from the second planetary gear, and may be variably connected with the transmission case via a brake and an one way clutch disposed in parallel, the first sun gear may be variably connected with the transmission case via a brake, the second sun gear may be variably connected with the transmission case via a brake, the third sun gear may be fixedly connected with the input shaft, and the other first planet carrier may act as an output element. The first planet carrier acting as an output element may be connected with an output gear.

In a further alternative embodiment of the present invention, a six-speed powertrain of an automatic transmission comprises first, second, and third planetary gear sets, an input shaft, and a transmission case, wherein the first planetary gear set is a first single pinion planetary gear set, the second planetary gear set is a second single pinion planetary gear set, and the third planetary gear set is a double pinion planetary gear set; the first single pinion planetary gear set has a first sun gear, two first planet carriers, a first planetary gear, and a first ring gear; the second single pinion planetary gear set has a second sun gear, a second planetary gear, and a second ring gear; the double pinion planetary gear set may be disposed adjacent to the second single pinion planetary gear set and has a third sun gear, a pair of third planetary gears, and a third ring gear. Further, one planetary gear of the pair of third planetary gears and the second planetary gear may be commonly connected by a common planet carrier such that the second and third planetary gears may independently rotate, the third ring gear and the first ring gear may be fixedly connected, the second ring gear and one first planet carrier may be fixedly connected, a torque of the input shaft may always be transmitted to the third sun gear or the second sun gear, and frictional elements consisting of two clutches and three brakes may be operated to realize six forward speeds and one reverse speed.

The first sun gear may be variably connected with the input shaft via a first clutch, the one first planet carrier and the second ring gear may be variably connected with the input shaft via a second clutch, the other first planet carrier may be variably connected with the transmission case via a first brake and a one-way clutch disposed in parallel, the third sun gear may be variably connected with the transmission case via a second brake, the first sun gear may be variably connected with the transmission case via a third brake, the second sun gear may be fixedly connected with the input shaft, and the third ring gear may be fixedly connected with the first ring gear and they may act as output elements. The third ring gear may be connected with the output gear and act as an output element. Also, the first ring gear may be connected with the output gear and act as an output element.

Alternatively, the first sun gear may be variably connected with the input shaft via a first clutch, a second planet carrier may be additionally included in the second single pinion planetary gear set and may be variably connected with the input shaft via a second clutch, the other first planet carrier may be variably connected with the transmission case via a first brake and a one way clutch disposed in parallel, the third sun gear may be variably connected with the transmission case via a second brake, the first sun gear may be variably connected with the transmission case via a third brake, the second sun gear may be fixedly connected with the input shaft, and the third ring gear may be fixedly connected with the first ring gear and they may act as output elements. The third ring gear may be connected with the output gear and act as an output element. Also, the first ring gear may be connected with the output gear and act as an output element.

Alternatively, the first sun gear may be variably connected with the input shaft via a first clutch, the common planet carrier may be variably connected with the input shaft via a second clutch, the other first planet carrier may be variably connected with the transmission case via a first brake and a one-way clutch disposed in parallel, the third sun gear may be variably connected with the transmission case via a second brake, the first sun gear may be variably connected with the transmission case via a third brake, the second sun gear may be fixedly connected with the input shaft, and the third ring gear may be fixedly connected with the first ring gear and they may act as output elements. The third ring gear may be connected with the output gear and act as an output element. Also, the first ring gear may be connected with the output gear and act as an output element.

Further alternatively, the second sun gear may be variably connected with the input shaft via a first clutch, a third planet carrier may be additionally included in the double pinion planetary gear set and may be variably connected with the input shaft via a second clutch, the third planet carrier may also be variably connected with the transmission case via a first brake and an one way clutch disposed in parallel, the first sun gear may be variably connected with the transmission case via a second brake, the second sun gear may be variably connected with the transmission case via a third brake, the third sun gear may be fixedly connected with the input shaft, and the other first planet carrier may act as an output element.

Alternatively, the second sun gear may be variably connected with the input shaft via a first clutch, the common planet carrier being commonly connected with the second single pinion planetary gear set and the double pinion planetary gear set may be variably connected with the input shaft via a second clutch, a third planet carrier may be additionally included in the double pinion planetary gear set and may be variably connected with the transmission case via a first brake and an one way clutch disposed in parallel, the first sun gear may be variably connected with the transmission case via a second brake, the second sun gear may be variably connected with the transmission case via a third brake, the third sun gear may be fixedly connected with the input shaft, and the other first planet carrier may act as an output element.

Still further alternatively, the second sun gear may be variably connected with the input shaft via a first clutch, a third planet carrier may be additionally included in the double pinion planetary gear set and may be variably connected with the input shaft via a second clutch, a second planet carrier may be additionally included in the second single pinion planetary gear set, separately formed from the second planetary gear, and may be variably connected with the transmission case via a first brake and an one way clutch disposed in parallel, the first sun gear may be connected with the transmission case via a second brake, the second sun gear may be variably connected with the transmission case via a third brake, the third sun gear may be fixedly connected with the input shaft, and the other first planet carrier may act as an output element.

As a still another alternative, the second sun gear may be variably connected with the input shaft via a first clutch, the third ring gear may be variably connected with the input shaft via a second clutch, a second planet carrier may be additionally included in the second single pinion planetary gear set, separately formed from the second planetary gear, and may be variably connected with the transmission case via a first brake and an one way clutch disposed in parallel, the first sun gear may be variably connected with the transmission case via a second brake, the second sun gear may be variably connected with the transmission case via a third brake, the third sun gear may be fixedly connected with the input shaft, and the other first planet carrier may act as an output element. The first planet carrier acting as an output element may be connected with an output gear.

The second brake and the one-way clutch may be operated for the first forward speed, the one-way clutch may be released and the third brake may be operated for the second forward speed from the first forward speed, the third brake may be released and the first clutch may be operated for the third forward speed from the second forward speed, the first clutch may be released and the second clutch may be operated for the fourth forward speed from the third forward speed, the second brake may be released and the first clutch may be operated for the fifth forward speed from the fourth forward speed, the first clutch may be released and the third brake may be operated for the sixth forward speed from the fifth forward speed, and the first clutch and the first brake may be operated for the reverse speed.

DETAILED DESCRIPTION OF THE EMBODIMENTS

Exemplary embodiments of the present invention will hereinafter be described in detail with reference to the accompanying drawings.

Firstly, a first exemplary embodiment of the present invention will be described hereinafter with reference to the accompanying drawings.

Figures 1, 2:
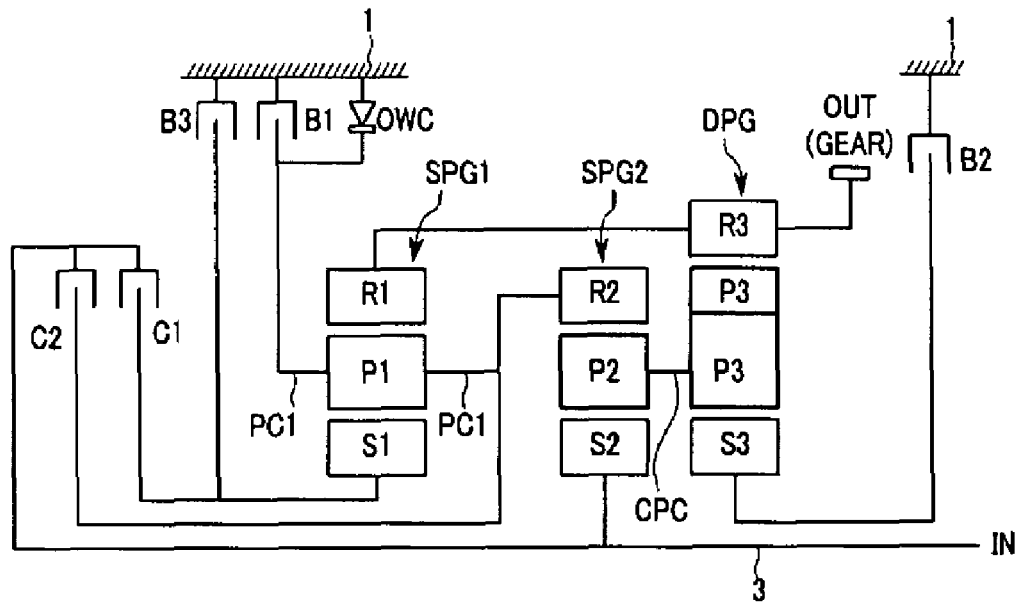
FIG. 1 is a schematic diagram of a powertrain of an automatic transmission according to a first exemplary embodiment of the present invention.
FIG. 2 is an operational chart of frictional elements of a powertrain of an automatic transmission according to all exemplary embodiments of the present invention.

According to a first exemplary embodiment of the present invention as shown in FIG. 1, six forward speeds and one reverse speed are realized by operation of frictional elements including two clutches and three brakes. The powertrain of an automatic transmission, according to first exemplary embodiment of the present invention, includes a first single pinion planetary gear set SPG1 arranged on an input shaft 3 connected to an engine output via a torque converter. The first single pinion planetary gear set SPG1 has a first sun gear S1, a first planetary gear P1, and a first ring gear R1.

On the rear of the first single pinion planetary gear set SPG1, a second single pinion planetary gear set SPG2, having a second sun gear S2, a second planetary gear P2, and a second ring gear R2, is provided.

On the rear of the second single pinion planetary gear set SPG2, a double pinion planetary gear set DPG, having a third sun gear S3, a pair of third planetary gears P3, and a third ring gear R3, is provided.

That is, the first single pinion planetary gear set SPG1 is disposed on a front portion of an automatic transmission, the double pinion planetary gear set DPG is disposed on a rear portion of the automatic transmission, and the second single pinion planetary gear set SPG2 is disposed between the first single pinion planetary gear set SPG1 and the double pinion planetary gear set DPG.

The first single pinion planetary gear set SPG1 has the first sun gear S1, the first ring gear R1, the first planetary gear P1, and additionally has two first planet carriers PC1 disposed at both sides of the first planetary gear P1 and rotatably supporting the first planetary gear P1 (engaged with the first sun gear S1 and the first ring gear R1).

The second single pinion planetary gear set SPG2 has the second sun gear S2, the second ring gear R2, and the second planetary gear P2 (engaged with the second sun gear S2 and the second ring gear R2). However, the second single pinion planetary gear set SPG2 does not have a second planet carrier PC2.

The double pinion planetary gear set DPG has the third sun gear S3, the third ring gear R3, and a pair of third planetary gears P3 engaged with the third sun gear S3 and the third ring gear R3. One planetary gear of the pair of third planetary gears P3 is connected to the adjacent second planetary gear P2 of the second single pinion planetary gear set SPG2 via a common planet carrier CPC, such that the third planetary gear R3 rotates independently from the second planetary gear P2 of the second single pinion planetary gear set SPG2.

In this embodiment, the common planet carrier CPC includes a second planet carrier carrying the second planetary gear P2 and a third planet carrier carrying the pair of third planetary gears P3 as portions thereof.

In addition, the third ring gear R3 of the double pinion planetary gear set DPG and the first ring gear R1 of the first single pinion planetary gear set SPG1 are fixedly connected with each other, and are integrally operated.

In addition, the second ring gear R2 of the second single pinion planetary gear set SPG2 and the corresponding first planet carrier PC1 of the first single pinion planetary gear set SPG1 are fixedly connected with each other.

In addition, the second sun gear S2 of the second single pinion planetary gear set SPG2 is fixedly connected with the input shaft 3 such that the power of the input shaft 3 is always firstly delivered to the second sun gear S2.

In more detail, the first sun gear S1 of the first single pinion planetary gear set SPG1 is variably connected with the input shaft 3 via a first clutch C1, and simultaneously the first sun gear S1 is variably connected with the transmission case 1 via a third brake B3.

In addition, the one first planet carrier PC1 is variably connected with the input shaft 3 via a second clutch C2, together with the second ring gear R2 of the second single pinion planetary gear set SPG2, and the other first planet carrier PC1 is connected with a first brake B1 and a one-way clutch OWC disposed parallel with each other on the transmission case 1.

In addition, the third sun gear S3 of the double pinion planetary gear set DPG is variably connected to the transmission case 1 via a second brake B2, and the third ring gear R3 is provided to act with the first ring gear R1 of the first single pinion planetary gear set SPG1 as an output element.

Here, an output gear OUT_GEAR is connected with the third ring gear R3 of the double pinion planetary gear set DPG, and acts as an output element.

Such a powertrain may be operated as shown in an operational chart in FIG. 2 so as to realize six forward speeds and one reverse speed. That is, the second brake B2 and the one way clutch OWC are operated for the first forward speed, the one-way clutch OWC is released and the third brake B3 is operated for the second forward speed from the first forward speed, the third brake B3 is released and the first clutch C1 is operated for the third forward speed from the second forward speed, and the first clutch C1 is released and the second clutch C2 is operated for the fourth forward speed from the third forward speed. The first brake B1 can be selectively operated at the first forward speed.

In addition, the second brake B2 is released and the first clutch C1 is operated for the fifth forward speed from the fourth forward speed, the first clutch C1 is released and the third brake B3 is operated for the sixth forward speed from the fifth forward speed, and the first clutch C1 and the first brake B1 are operated for the reverse speed, so as to realize six forward speeds and one reverse speed.

Hereinafter, a shifting process of the six-speed powertrain of the first exemplary embodiment of the present invention will be described in detail, with reference to FIG. 3 and FIG. 4.

Figure 3:
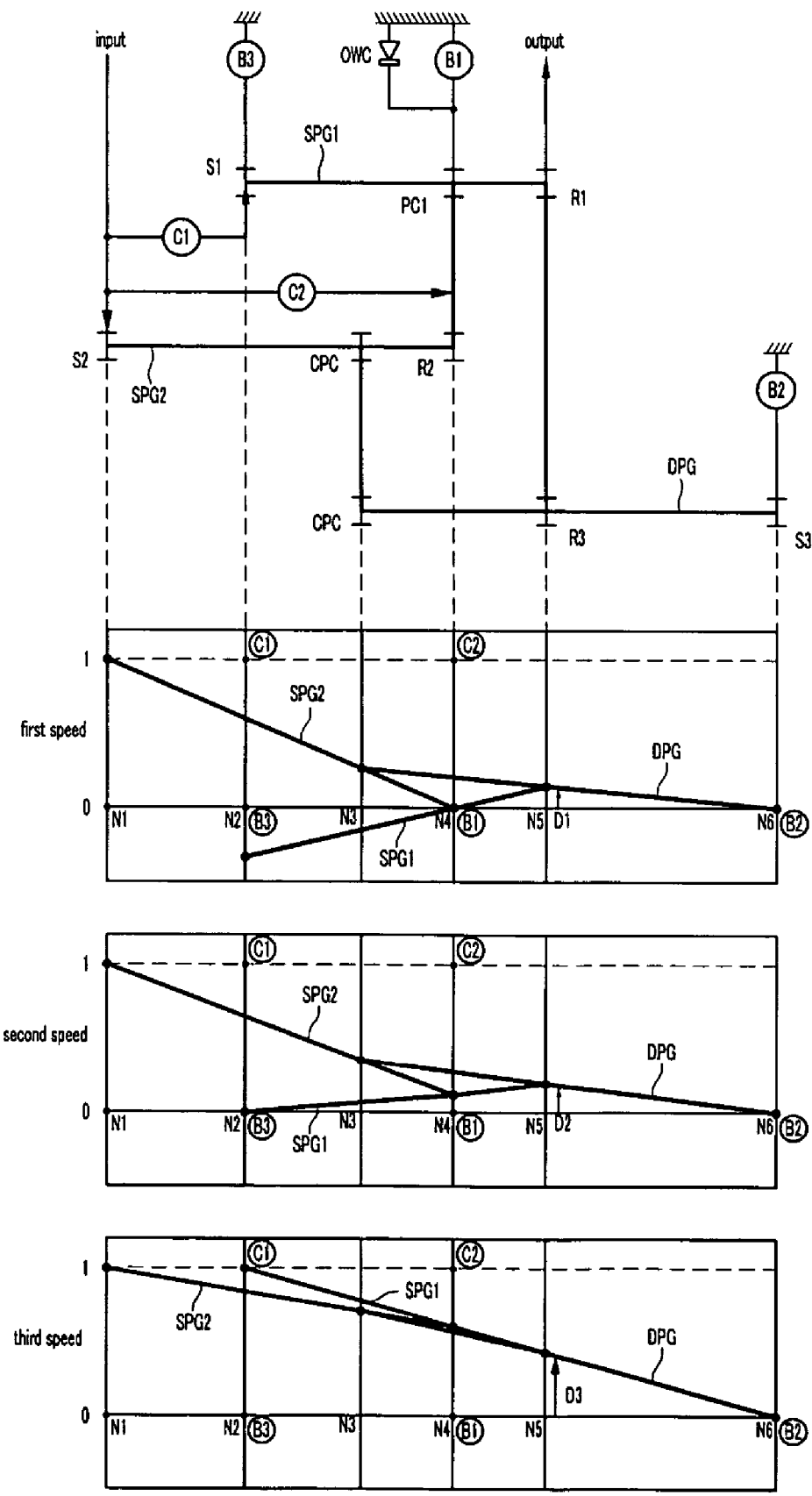
FIG. 3 is a speed diagram for first to third forward speeds of a powertrain of automatic transmission according to the first exemplary embodiment of the present invention.
Figure 4:
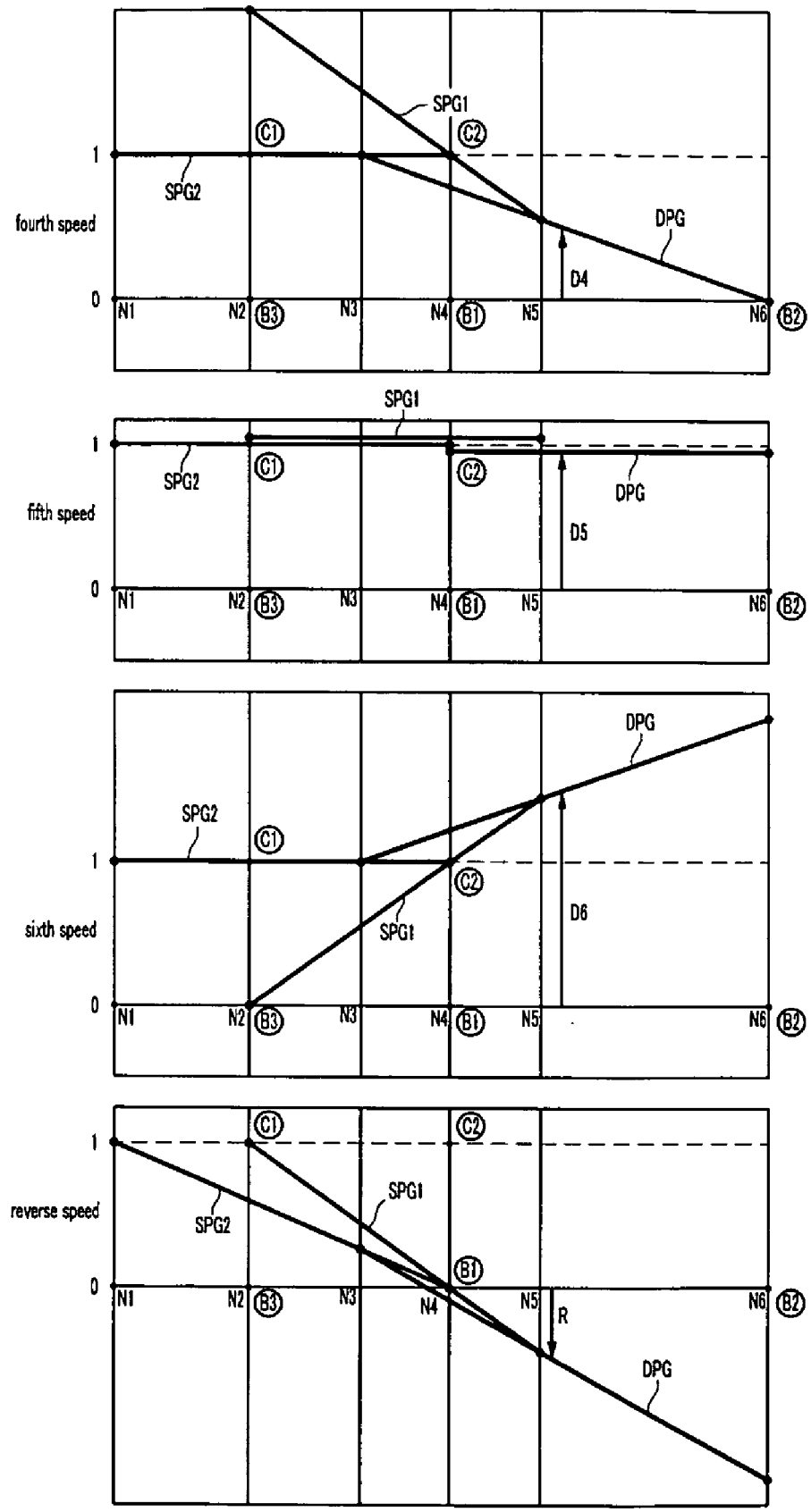
FIG. 4 is a speed diagram for fourth to sixth forward speeds and a reverse speed of a powertrain of an automatic transmission according to the first exemplary embodiment of the present invention.

The operational elements are arranged at respective nodes, as shown by FIG. 3 and FIG. 4 showing speed diagrams for the first to sixth forward speeds and the reverse speed. A first node N1 is formed by the second sun gear S2, a second node N2 is formed by the first sun gear S1, a third node N3 is formed by the common planet carrier CPC.

The fourth node N4 is formed by the first planet carrier PC1 and the second ring gear R2, the fifth node N5 is an output node and is formed by the first ring gear R1 and the third ring gear R3, and the sixth node N6 is formed by the third sun gear S3.

While the one-way clutch OWC and the second brake B2 are operated, the first node (i.e., the second sun gear S2 of the second single pinion planetary gear set SPG2) receives the input of the engine speed, and at the same time, the fourth node N4 and the sixth node N6 act as fixed elements. Therefore, three speed lines for the first forward speed, as shown in FIG. 3, are formed by the cooperative operation of the first and second single pinion planetary gear sets SPG1 and SPG2 and the double pinion planetary gear set DPG. Then, an output element of the fifth node N5 rotates at a speed D1, and the first forward speed is realized.

For the second forward speed, the third brake B1 is operated from the first forward speed.

The first node N1 (i.e., the second sun gear S2 of the second single pinion planetary gear set SPG2) receives the input of the engine speed. At the same time, the fourth node N4, the sixth node N6, and the second node N2 act as fixed elements. Therefore, three speed lines for the second forward speed, as shown in the shift drawing of FIG. 3, are formed, due to the cooperative operation of the first and second single pinion planetary gear sets SPG1 and SPG2 and the double pinion planetary gear set DPG. An output element of the fifth node N5 rotates at a speed D2, and the second forward speed is realized.

For the third forward speed, the third brake B3 is released and the first clutch C1 is operated from the second forward speed.

Then, the first node N1 (i.e., the second sun gear S2 of the second single pinion planetary gear set SPG2) receives the input of the engine speed, and at the same time, the second node N2 (i.e., the first sun gear S1) also receives the input of the same engine speed.

In addition, the sixth node N6 acts as a fixed element as in the second forward speed. Therefore, three speed lines for the third forward speed, as shown in the shift drawing of FIG. 3, are formed by the cooperative operation of the first and second single pinion planetary gear sets SPG1 and SPG2 and the double pinion planetary gear set DPG. An output element of the fifth node N5 rotates at a speed D3, and the third forward speed is realized.

For the fourth forward speed, the first clutch C1 is released and the second clutch C2 is operated from the third forward speed.

The first node N1 (i.e., the second sun gear S2 of the second single pinion planetary gear set SPG2) receives the input of the engine, and the fourth node N4 (i.e., the first planet carrier PC1 and the second ring gear R2) also receives the input of the engine.

In addition, the sixth node N6 acts as a fixed element as in the third forward speed. Therefore, three speed lines for the fourth forward speed, as shown in FIG. 4, are formed by the cooperative operation of the first and second single pinion planetary gear sets SPG1 and SPG2 and the double pinion planetary gear set DPG. The output element of the fifth node N5 rotates at a speed of D4, and the fourth forward speed is realized.

For the fifth forward speed, the second brake B2 is released and the first clutch C1 is operated from the fourth forward speed.

Then, the first node N1 (i.e., the second sun gear S2 of the second single pinion planetary gear set SPG2) receives the input of the engine speed, and at the same time, the fourth node N4 (the first planet carrier PC1 and the second ring gear R2) and the second node N2 (i.e., the first sun gear S1) also receive the same input of the engine speed.

That is, all operational elements included in the first and second single pinion planetary gear sets SPG1 and SPG2 and the double pinion planetary gear set DPG rotate at the same speed as they are fixedly connected. Therefore, a speed line for the fifth forward speed is formed the same as the input of the engine speed, as shown in FIG. 4. The output element of the fifth node N5 rotates at a speed D5 which is the same as the input of the engine speed, and the fifth forward speed is realized.

For the sixth forward speed, the first clutch C1 is released and the third brake B3 is operated from the fifth forward speed.

The first node N1 (i.e., the second sun gear S2 of the second single pinion planetary gear set SPG2) receives the input of the engine speed, and at the same time, the fourth node N4 (i.e., the first planet carrier PC1 and the second ring gear R2) also receives the same input of the engine speed.

In addition, the second node N2 acts as a fixed element. Therefore, three speed lines for the sixth forward speed, as shown in FIG. 4, are formed due to the cooperative operation of the first and second single pinion planetary gear sets SPG1 and SPG2 and the double pinion planetary gear set DPG. An output element of the fifth node N5 rotates at a speed of D6, and the sixth forward speed is realized.

For the reverse speed, the first clutch C1 and the first brake B1 are operated.

In that case, the first node N1 (i.e., the second sun gear S2 of the second single pinion planetary gear set SPG2) receives the input of the engine speed, and the second node N2 (i.e., the first sun gear S1) also receives the same input of the engine speed.

In addition, the fourth node N4 acts as a fixed element. Therefore, three speed lines for the reverse speed, as shown in FIG. 4, are formed due to the cooperative operation of the first and second single pinion planetary gear sets SPG1 and SPG2 and the double pinion planetary gear set DPG. The output element of the fifth node N5 rotates at a speed R, and the reverse speed is realized.

Figure 5:
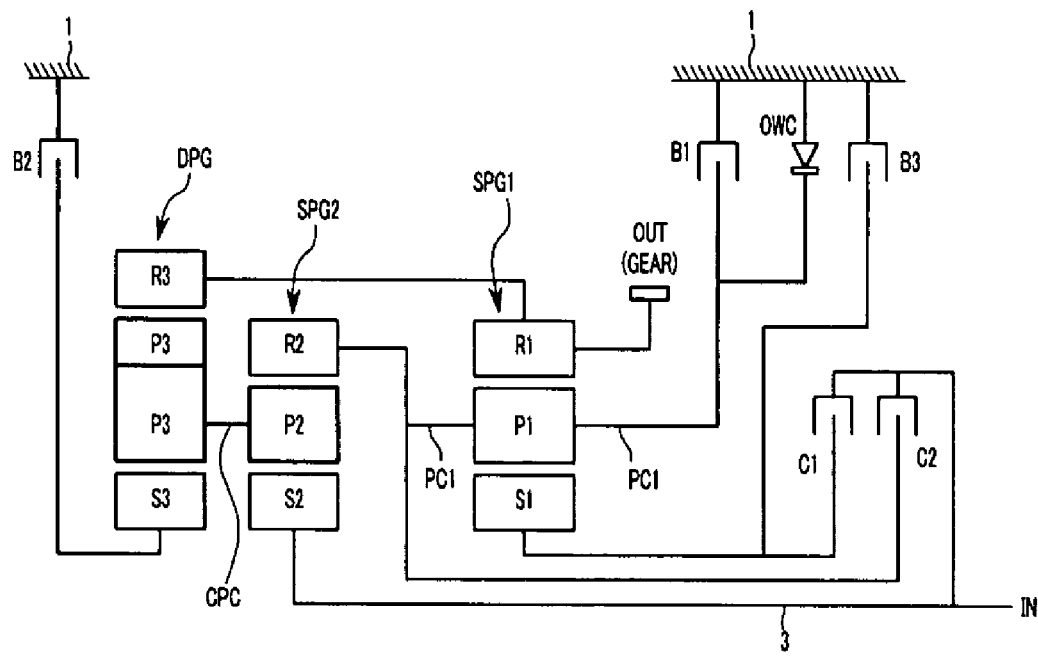
FIG. 5 is a schematic diagram of a powertrain of an automatic transmission according to a second exemplary embodiment of the present invention.

Hereinafter, a second exemplary embodiment of the present invention will be described with reference to FIG. 5. The powertrain of an automatic transmission according to a second exemplary embodiment of the present invention, includes a first single pinion planetary gear set SPG1 arranged on an input shaft 3 connected to an engine output via a torque converter, a second single pinion planetary gear set SPG2 arranged at the rear of the first single pinion planetary gear set SPG1, a double pinion planetary gear set DPG arranged at the rear of the second single pinion planetary gear set SPG2, and frictional elements consisting of two clutches and three brakes so as to realize the six forward speeds and one reverse speed, as in the first exemplary embodiment of the present invention.

That is, according to this embodiment of the present invention, the first single pinion planetary gear set SPG1 is disposed on the front portion of the transmission, the double pinion planetary gear set DPG is disposed on the rear portion of the transmission, and the second single pinion planetary gear set SPG2 is disposed between the first single pinion planetary gear set SPG1 and the double pinion planetary gear set DPG, as in the first exemplary embodiment of the present invention.

The arrangement and operation of the above mentioned five frictional elements is the same as in the first exemplary embodiment. However, according to the first embodiment of the present invention, the output element of the third ring gear R3 of the double pinion planetary gear set DPG is connected to the output gear OUT_GEAR. On the other hand, according to this embodiment of the present invention, the first ring gear R1 of the first pinion planetary gear set SPG1 is connected to the output gear OUT_GEAR.

The power delivery paths of a powertrain of an automatic transmission, using the five frictional elements, from the input shaft 3 to the first and second single pinion planetary gear sets SPG1 and SPG2 and the double pinion planetary gear set DPG, according to this exemplary embodiment of the present invention are the same as the power delivery paths in the first exemplary embodiment of the present invention. The operational chart according to this exemplary embodiment of the present invention is the same as the operational chart according to the first exemplary embodiment, as shown in FIG. 2.

FIG. 3 and FIG. 4 illustrate the shifting process of the powertrain according to the first exemplary embodiment of the present invention, but a shifting process of the powertrain according to the second exemplary embodiment of the present invention can be also illustrated by FIG. 3 and FIG. 4. Since in this embodiment of present invention, the interpretation method of the speed diagrams is the same as in the first exemplary embodiment of the present invention as described above, a more detailed description about the shifting process according to the second embodiment of the present invention will be omitted.

Figure 6:
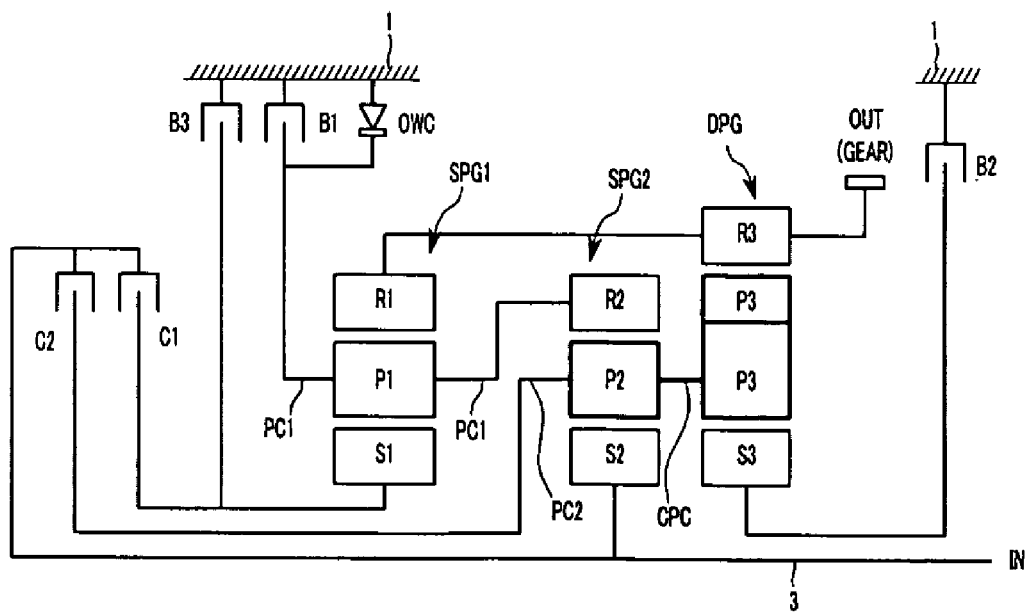
FIG. 6 is a schematic diagram of a powertrain of an automatic transmission according to a third exemplary embodiment of the present invention.

Hereinafter, a third exemplary embodiment of the present invention will be described with reference to FIG. 6 to FIG. 8. A powertrain of an automatic transmission according to a third exemplary embodiment of the present invention, includes a first single pinion planetary gear set SPG1 arranged on an input shaft 3 connected to an engine output via a torque converter, a second single pinion planetary gear set SPG2 arranged at the rear of the first single pinion planetary gear set SPG1, a double pinion planetary gear set DPG arranged at the rear of the second single pinion planetary gear set SPG2, and frictional elements consisting of two clutches and three brakes so as to realize the six forward speeds and one reverse speed, as in the first exemplary embodiment of the present invention.

That is, according to this embodiment of the present invention, the first single pinion planetary gear set SPG1 is disposed on the front portion of the transmission, the double pinion planetary gear set DPG is disposed on the rear portion of the transmission, and the second single pinion planetary gear set SPG2 is disposed between the first single pinion planetary gear set SPG1 and the double pinion planetary gear set DPG, as in the first exemplary embodiment of the present invention.

Further, in the second single pinion planetary gear set SPG2, the second planetary gear P2 (disposed between the second sun gear S2 and the second ring gear R2 and engaged with both the second sun gear S2 and the second ring gear R2) is connected with the common planet carrier CPC (connected with one planetary gear of the pair of third planetary gears P3 of the double pinion planetary gear set DPG). However, in addition, the second planetary gear P2 is connected with a second planet carrier PC2 rotatably supporting the second planetary gear P2.

The arrangement and operation of the five frictional elements according to this embodiment of the present invention is the same as in the first exemplary embodiment, except that the second planet carrier PC2 (which is connected to the the second planetary gear P2 of the second planetary gear set SPG2) is variably connected with the input shaft 3 via the second clutch C2. According to the first exemplary embodiment of the present invention, the one first planet carrier PC1 of the first single pinion planetary gear set SPG1 and the second ring gear R2 of the second single pinion planetary gear set SPG2 are variably connected to the input shaft 3 via the second clutch C2.

The power delivery paths of a power train of an automatic transmission from the input shaft 3 to the first and second single pinion planetary gear sets SPG1 and SPG2 and the double pinion planetary gear set DPG are the same as in the first exemplary embodiment of the present invention, except that for the fourth to sixth forward speeds, the power from the input shaft is delivered to the common planet carrier CPC via the second planet carrier PC2. According to the above described first exemplary embodiment of the present invention, the power from the input shaft 3 is delivered to the first planet carrier PC1 and the second ring gear R2 at the same speed as the input shaft 3. Therefore, the speed lines and the operational chart for this embodiment of the present invention are the same as in the first exemplary embodiment of the present invention.

Figure 7:
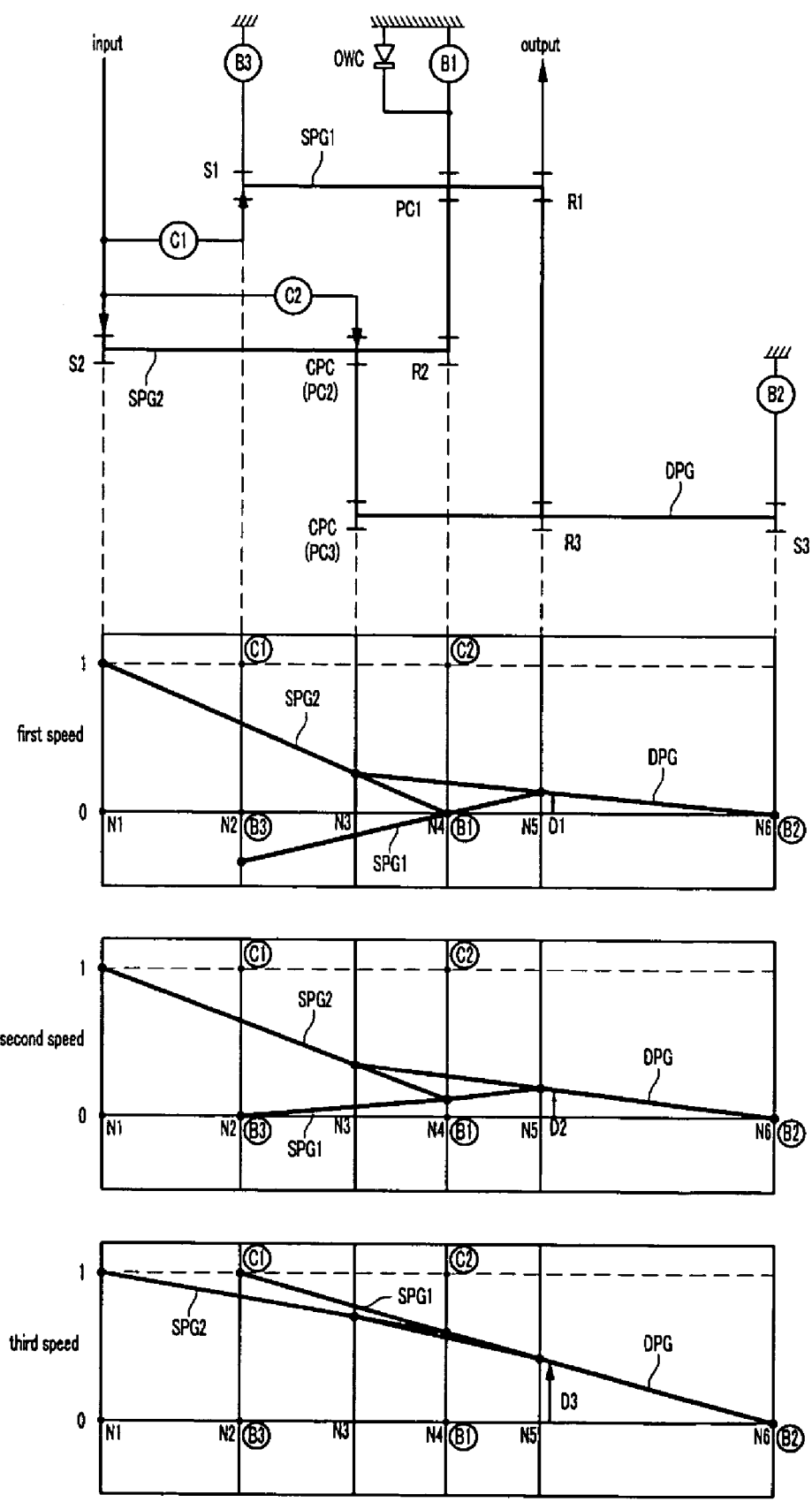
FIG. 7 is a speed diagram for first to third forward speeds of a powertrain of an automatic transmission according to the third exemplary embodiment of the present invention.
Figure 8:
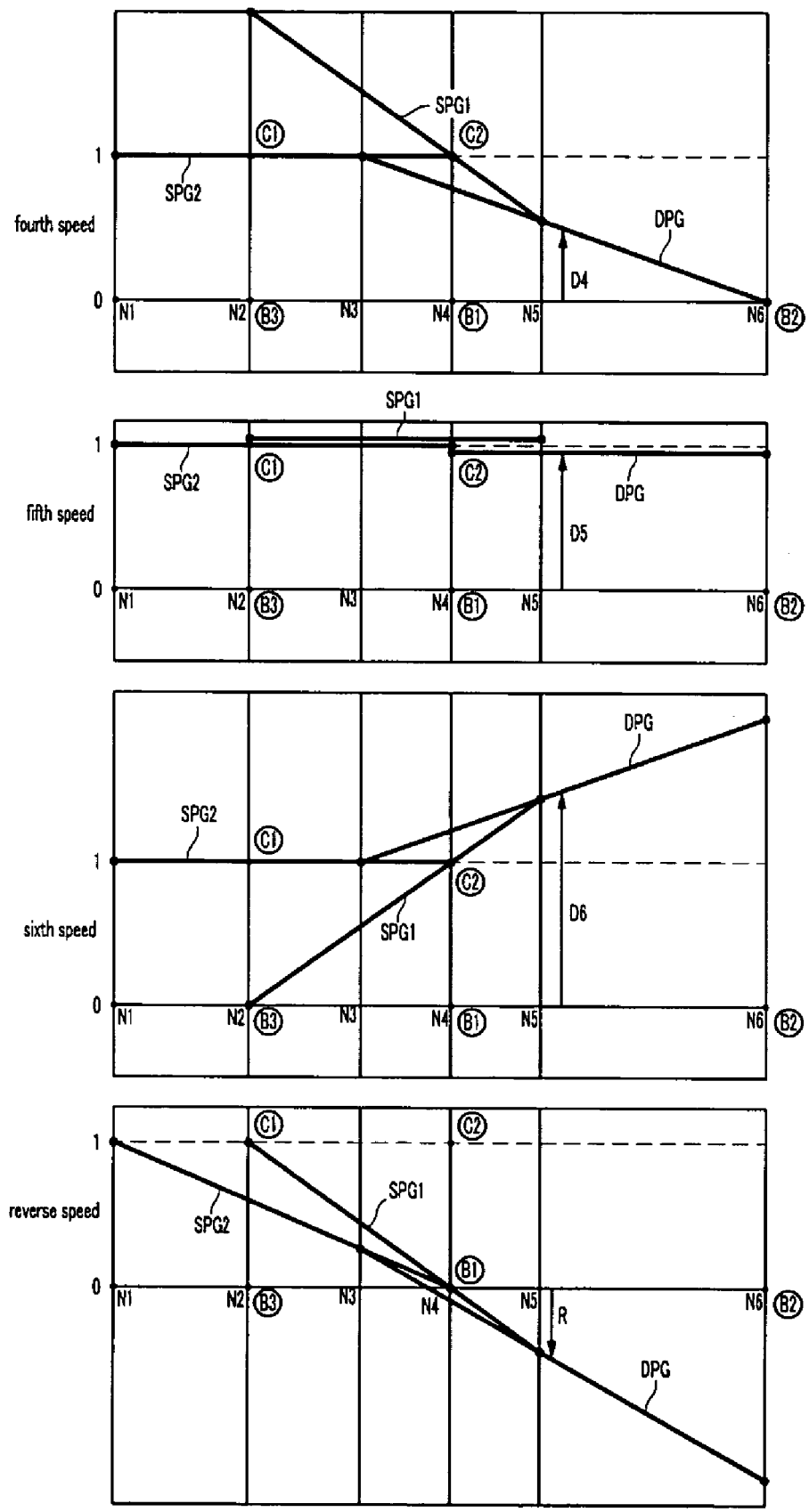
FIG. 8 is a speed diagram for fourth to sixth forward speeds and a reverse speed of a powertrain of an automatic transmission according to the third exemplary embodiment of the present invention.

FIG. 7 and FIG. 8 illustrate a shifting process of the powertrain according to the third exemplary embodiment of the present invention. Since in this embodiment of the present invention, the interpretation method of the speed diagrams is the same as in the first exemplary embodiment of the present invention, and a person of an ordinary skill in the art can easily understand the shifting process of the powertrain shown in FIG. 7 and FIG. 8 with reference to the description about the shifting process according to the first exemplary embodiment of the present invention as described above, a detailed description about the shifting process according to the third embodiment of the present invention will be omitted.

Figure 9:
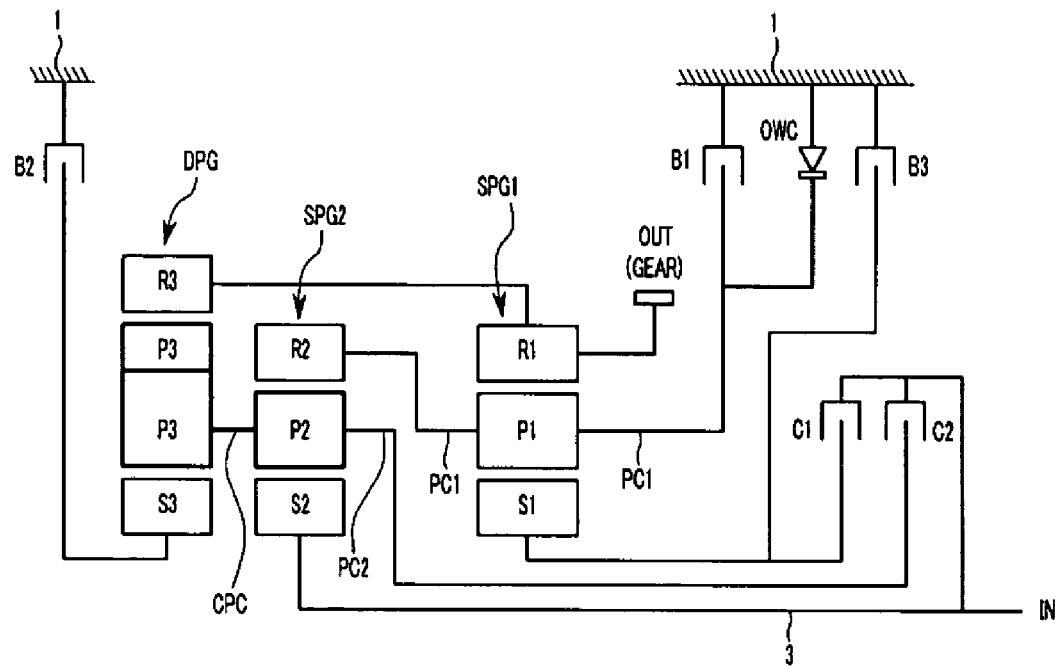
FIG. 9 to FIG. 11 are schematic diagrams of powertrains of automatic transmission according to fourth to sixth exemplary embodiments of the present invention.

Hereinafter, a powertrain according to the fourth exemplary embodiment of the present invention will be described with reference to FIG. 9. A powertrain of an automatic transmission according to a fourth exemplary embodiment of the present invention includes a first single pinion planetary gear set SPG1 arranged on an input shaft 3 connected to an engine output via a torque converter, a second single pinion planetary gear set SPG2 arranged at the rear of the first single pinion planetary gear set SPG1, a double pinion planetary gear set DPG arranged at the rear of the second single pinion planetary gear set SPG2, and frictional elements consisting of two clutches and three brakes so as to realize the six forward speeds and one reverse speed, as in the first exemplary embodiment of the present invention.

That is, according to this embodiment of the present invention, the first single pinion planetary gear set SPG1 is disposed on the front portion of the transmission, the double pinion planetary gear set DPG is disposed on the rear portion of the transmission, and the second single pinion planetary gear set SPG2 is disposed between the first single pinion planetary gear set SPG1 and the double pinion planetary gear set DPG, as in the first exemplary embodiment of the present invention.

The second single pinion planetary gear set SPG2, the second planetary gear P2 (disposed between the second sun gear S2 and the second ring gear R2 and engaged with both the second sun gear S2 and the second ring gear R2) is connected with the common planet carrier CPC (connected with one of the third planetary gears of the double pinion planetary gear set DPG). However, in addition, the second planetary gear P2 is connected with a second planet carrier PC2 rotatably supporting the second planetary gear.

The arrangement and operation of the five frictional elements according to this embodiment of the present invention is the same as in the first exemplary embodiment, except that the second planet carrier PC2 (which is connected to the the second planetary gear P2 of the second planetary gear set SPG2) is variably connected with the input shaft 3 via the second clutch C2. According to the first exemplary embodiment of the present invention, the first planet carrier PC1 of the first single pinion planetary gear set SPG1 and the second ring gear R2 of the second single pinion planetary gear set SPG2 are variably connected to the input shaft 3 via the second clutch C2.

In addition, according to the fourth exemplary embodiment, the first ring gear R1 of the first single pinion planetary gear set SPG1 is connected to the output gear OUT_GEAR. On the other hand, according to the first exemplary embodiment of the present invention, the third ring gear R3 of the double pinion planetary gear set DPG acting as an output element is connected to the output gear OUT_GEAR The power delivery paths of the power train of an automatic transmission from the input shaft 3 to the first and second single pinion planetary gear sets SPG1 and SPG2 and the double pinion planetary gear set DPG are the same as in the first exemplary embodiment of the present invention, except that for the fourth to sixth forward speeds, the power from the input shaft is delivered to the common planet carrier CPC via the second planet carrier PC2. According to the above described first exemplary embodiment of the present invention, the power from the input shaft 3 is delivered to the first planet carrier PC1 and the second ring gear R2 at the same speed as the input shaft 3. Therefore, the speed lines and the operational chart for this embodiment of the present invention are the same as in the first exemplary embodiment of the present invention.

FIG. 7 and FIG. 8 illustrate a shifting process of the powertrain according to the third exemplary embodiment of the present invention, but a shifting process of the powertrain according to the fourth exemplary embodiment of the present invention can be also illustrated by FIG. 7 and FIG. 8. Since in this embodiment of present invention, the interpretation method of the speed diagrams is the same as in the first exemplary embodiment of the present invention, and a person of an ordinary skill in the art can easily understand the shifting process of the powertrain shown in FIG. 7 and FIG. 8 with reference to the description about the shifting process according to the first exemplary embodiment of the present invention as described above, a detailed description about the shifting process according to the fourth embodiment of the present invention will be omitted.

Figure 10:
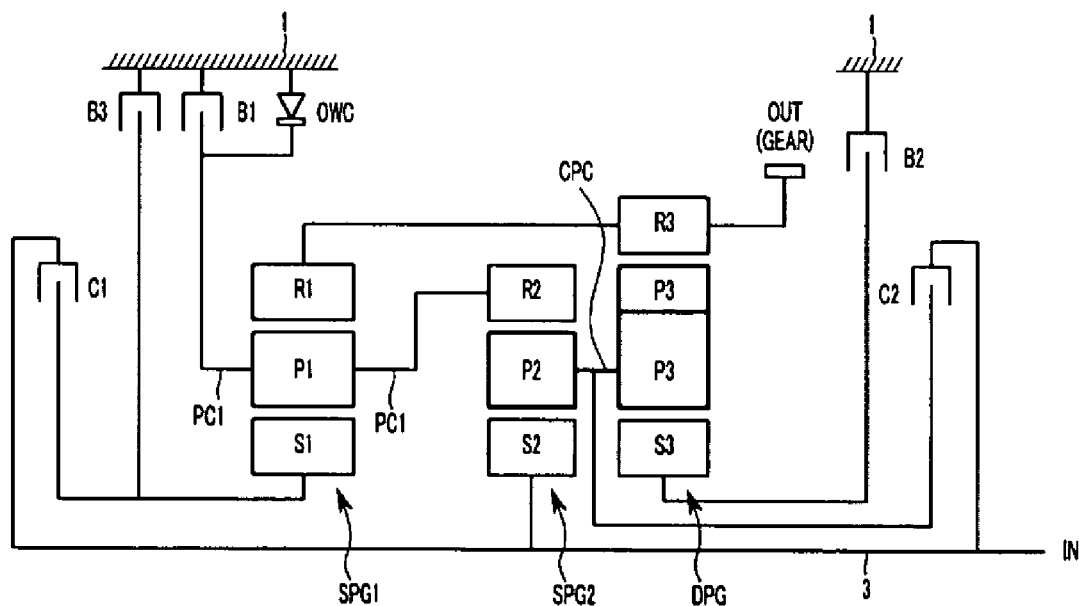

Hereinafter, referring to FIG. 10, a powertrain of an automatic transmission according to a fifth exemplary embodiment of the present invention will be described. A powertrain of an automatic transmission according to a fifth exemplary embodiment of the present invention includes a first single pinion planetary gear set SPG1 arranged on an input shaft 3 connected to an engine output via a torque converter, a second single pinion planetary gear set SPG2 arranged at the rear of the first single pinion planetary gear set SPG1, a double pinion planetary gear set DPG arranged at the rear of the second single pinion planetary gear set SPG2, and frictional elements consisting of two clutches and three brakes so as to realize the six forward speeds and one reverse speed, as in the first exemplary embodiment of the present invention.

That is, according to this embodiment of the present invention, the first single pinion planetary gear set SPG1 is disposed on the front portion of the transmission, the double pinion planetary gear set DPG is disposed on the rear portion of the transmission, and the second single pinion planetary gear set SPG2 is disposed between the first single pinion planetary gear set SPG1 and the double pinion planetary gear set DPG, as in the first exemplary embodiment of the present invention.

The arrangement and operation of the five frictional elements according to this embodiment of the present invention is almost the same as in the first exemplary embodiment, except that the common planet carrier CPC (which connects the second planetary gear P2 of the second single pinion planetary gear set SPG2 and one of the pair of third planetary gears P3 of the double pinion planetary gear set DPG) is variably connected with the input shaft 3 via the second clutch C2. According to the first exemplary embodiment of the present invention, the first planet carrier PC1 of the first single pinion planetary gear set SPG1 and the second ring gear R2 of the second single pinion planetary gear set SPG2 are variably connected to the input shaft 3 via the second clutch C2.

The power delivery paths of the powertrain of an automatic transmission using five frictional elements from the input shaft 3 to the first and second single pinion planetary gear sets SPG1 and SPG2 and the double pinion planetary gear set DPG are the same as in the first exemplary embodiment of the present invention, except that for the fourth to sixth forward speed the second clutch C2 is operated and the power from the input shaft 3 is delivered to the common planet carrier CPC at the same speed as the input shaft 3. According to the above described first exemplary embodiment of the present invention, when the second clutch C2 is operated for the fourth to sixth forward speeds, the power from the input shaft 3 is delivered to the first planet carrier PC1 and the second ring gear R2 at the same speed as the input shaft 3. Therefore, the speed lines and the operational chart for this embodiment of the present invention are the same as in the first exemplary embodiment of the present invention.

FIG. 7 and FIG. 8 illustrate a shifting process of the powertrain according to the third exemplary embodiment of the present invention, but a shifting process of the powertrain according to the fifth exemplary embodiment of the present invention can be also illustrated by FIG. 7 and FIG. 8. Since in this embodiment of present invention, the interpretation method of the speed diagrams is the same as in the first exemplary embodiment of the present invention, and a person of an ordinary skill in the art can easily understand the shifting process of the powertrain shown in FIG. 7 and FIG. 8 with reference to the description about the shifting process according to the first exemplary embodiment of the present invention as described above, a detailed description about the shifting process according to the fifth embodiment of the present invention will be omitted.

Figure 11:
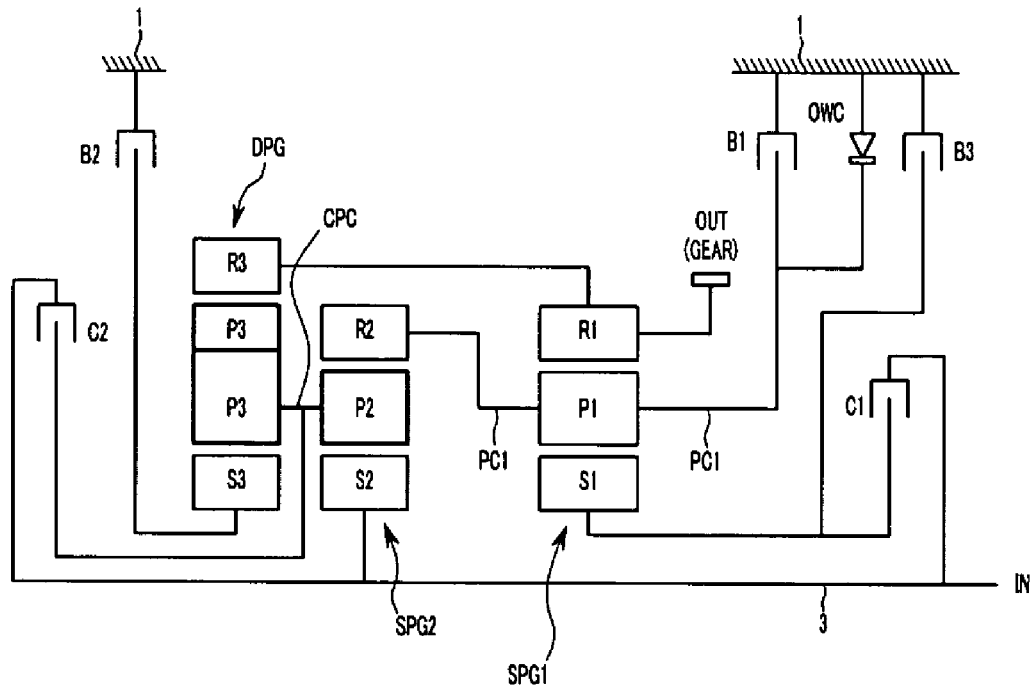

Hereinafter, the powertrain of an automatic transmission according to a sixth exemplary embodiment of the present invention will be described with reference to FIG. 11. A powertrain of an automatic transmission according to a sixth exemplary embodiment of the present invention, includes a first single pinion planetary gear set SPG1 arranged on an input shaft 3 connected to an engine output via a torque converter, a second single pinion planetary gear set SPG2 arranged at the rear of the first single pinion planetary gear set SPG1, a double pinion planetary gear set DPG arranged at the rear of the second single pinion planetary gear set SPG2, and frictional elements consisting of two clutches and three brakes so as to realize the six forward speeds and one reverse speed, as in the first exemplary embodiment of the present invention.

That is, according to this embodiment of the present invention, the first single pinion planetary gear set SPG1 is disposed on the front portion of the transmission, the double pinion planetary gear set DPG is disposed on the rear portion of the transmission, and the second single pinion planetary gear set SPG2 is disposed between the first single pinion planetary gear set SPG1 and the double pinion planetary gear set DPG, as in the first exemplary embodiment of the present invention.

The arrangement and operation of the five frictional elements according to this embodiment of the present invention is almost the same as in the first exemplary embodiment, except that the common planet carrier CPC (which connects the second planetary gear P2 of the second single pinion planetary gear set SPG2 and one of the pair of third planetary gears P3 of the double pinion planetary gear set DPG) is variably connected with the input shaft 3 via the second clutch C2. According to the first exemplary embodiment of the present invention, the first planet carrier PC1 of the first single pinion planetary gear set SPG1 and the second ring gear R2 of the second single pinion planetary gear set SPG2 are variably connected to the input shaft 3 via the second clutch C2.

In addition, according to the sixth exemplary embodiment of the present invention the first ring gear R1 of the first single pinion planetary gear set SPG1 is connected to the output gear OUT_GEAR. On the other hand, according to the first exemplary embodiment of the present invention, the third ring gear R3 of the double pinion planetary gear set DPG is connected to the output gear OUT_GEAR The power delivery paths of a powertrain of an automatic transmission using five frictional elements from the input shaft 3 to the first and second single pinion planetary gear sets SPG1 and SPG2 and the double pinion planetary gear set DPG are the same as in the first exemplary embodiment of the present invention, except that for the fourth to sixth forward speeds, the second clutch C2 is operated and the power from the input shaft 3 is delivered to the common planet carrier CPC at the same speed as the input shaft 3. According to the above described first exemplary embodiment of the present invention, when the second clutch C2 is operated for the fourth to sixth forward speeds, the power from the input shaft 3 is delivered to the first planet carrier PC1 and the second ring gear R2 at the same speed as the input shaft 3. Therefore, the speed lines and the operational chart for this embodiment of the present invention are the same as in the first exemplary embodiment of the present invention.

FIG. 7 and FIG. 8 illustrate a shifting process of the powertrain according to the third exemplary embodiment of the present invention, but a shifting process of the powertrain according to the sixth exemplary embodiment of the present invention can be also illustrated by FIG. 7 and FIG. 8. Since in this embodiment of present invention, the interpretation method of the speed diagrams is the same as in the first exemplary embodiment of the present invention, and a person of an ordinary skill in the art can easily understand the shifting process of the powertrain shown in FIG. 7 and FIG. 8 with reference to the description about the shifting process according to the first exemplary embodiment of the present invention as described above, a detailed description about the shifting process according to the sixth embodiment of the present invention will be omitted.

Figure 12:
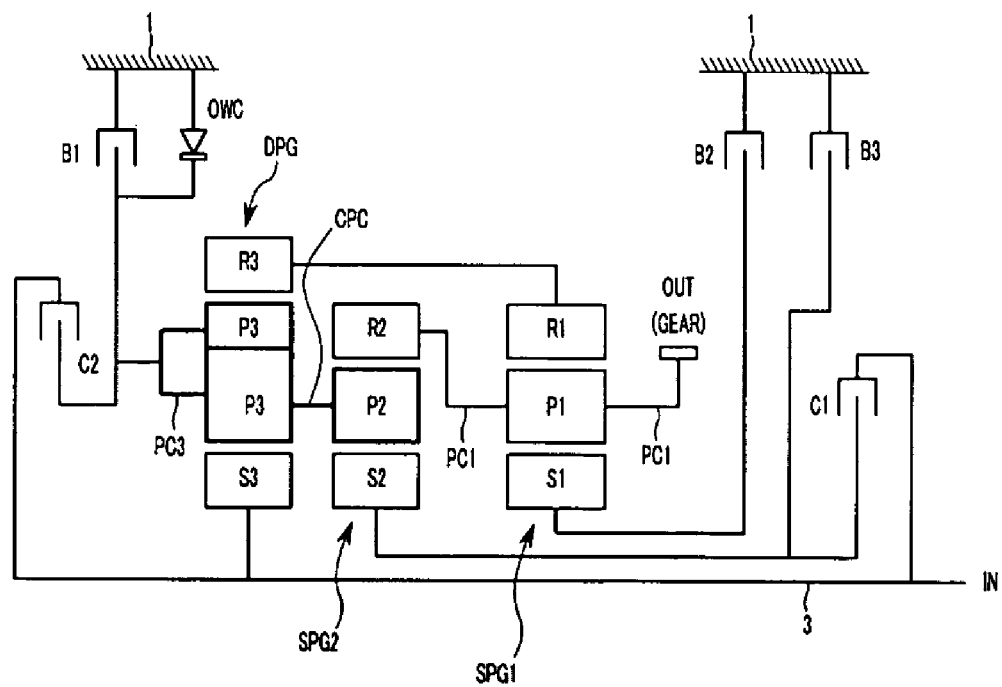
FIG. 12 is a schematic diagram of a powertrain of an automatic transmission according to a seventh exemplary embodiment of the present invention.

Hereinafter, the powertrain of an automatic transmission according to a seventh exemplary embodiment of the present invention will be described in more detail, with reference to the accompanying drawings, and in particular FIG. 12. A powertrain of an automatic transmission according to a seventh exemplary embodiment of the present invention includes a first single pinion planetary gear set SPG1 arranged on an input shaft 3 connected to an engine output via a torque converter, a second single pinion planetary gear set SPG2 arranged at the rear of the first single pinion planetary gear set SPG1, a double pinion planetary gear set DPG arranged at the rear of the second single pinion planetary gear set SPG2, and frictional elements consisting of two clutches and three brakes so as to realize the six forward speeds and one reverse speed, as in the first exemplary embodiment of the present invention.

That is, according to this embodiment of the present invention, the first single pinion planetary gear set SPG1 is disposed on the front portion of the transmission, the double pinion planetary gear set DPG is disposed on the rear portion of the transmission, and the second single pinion planetary gear set SPG2 is disposed between the first single pinion planetary gear set SPG1 and the double pinion planetary gear set DPG, as in the first exemplary embodiment of the present invention.

The first single pinion planetary gear set SPG1 includes a first sun gear S1, a first ring gear R1, and two first planet carriers PC1 rotatably supporting a first planetary gear P1 (engaged with both the first sun gear S1 and the first ring gear R1) at both sides of the first planetary gear P1.

The second single pinion planetary gear set SPG2 has a second sun gear S2, a second ring gear R2, and a second planetary gear P2 (engaged with the second sun gear S2 and the second ring gear R2). However, the second single pinion planetary gear set SPG2 does not have a second planet carrier PC2.

The double pinion planetary gear set DPG includes a third sun gear S3, a third ring gear R3, and a pair of third planetary gears P3 engaged with the third sun gear S3 and the third ring gear R3. One of the pair of third planetary gears P3 is connected with the second planetary gear P2 of the second single pinion planetary gear set SPG2 via a common planet carrier CPC such that the third planetary gear P3 and the second planetary gear P2 rotate independently from each other.

In addition, the pair of third planetary gears P3 of the double pinion planetary gear set DPG are connected with a third planet carrier PC3, as well as the common planet carrier CPC. The third planet carrier PC3 rotatably supports the pair of third planetary gears P3.

Here, the arrangement and operation of the five frictional elements is the same as in the first exemplary embodiment of the present invention where the third ring gear R3 of the double pinion planetary gear set DPG and the first ring gear R1 of the first single pinion planetary gear set SPG1 are directly and fixedly connected with each other.

In addition, the second ring gear R2 of the second single pinion planetary gear set SPG2 is fixedly connected with the corresponding first planet carrier PC1 of the single pinion planetary gear set SPG1 as in the first exemplary embodiment of the present invention.

However, according to the first exemplary embodiment of the present invention, the second sun gear S2 of the second single pinion planetary gear set SPG2 is fixedly connected to the input shaft 3 and the first sun gear S1 of the first single pinion planetary gear set SPG1 is variably connected to the input shaft 3 via the first clutch C1. On the other hand, according to the seventh exemplary embodiment of the present invention, the third sun gear S3 of the double pinion planetary gear set DPG is fixedly connected to the input shaft 3. The second sun gear S2 is variably connected with the input shaft 3 via a first clutch C1 and acts as a variable input element, and is variably connected with the transmission case 1 via a third brake B3 and acts as a variable fixed element.

According to this exemplary embodiment of the present invention, the first sun gear S1 of the first single pinion planetary gear set SPG1 is connected with the transmission case 1 with via a second brake B2, and acts as a variable fixed element.

In addition, according to the present embodiment of the present invention, the third planet carrier PC3 is variably connected with the input shaft 3 via a second clutch C2 and acts as a variable input element, and is variably connected with the transmission case 1 via a first brake B1 and a one way clutch OWC (which are disposed in parallel) and acts as a variable fixed element, unlike in the first exemplary embodiment of the present invention.

In addition, according to the seventh exemplary embodiment of the present invention, the other first planet carrier PC1 (not the one fixedly connected with the second ring gear R2) is connected with an output gear OUT_GEAR and acts as an output element, unlike in the first exemplary embodiment of the present invention where the third ring gear R3 is connected with the output gear OUT_GEAR such that the third gear R3 and the first ring gear R1 act as output elements.

Figure 13:
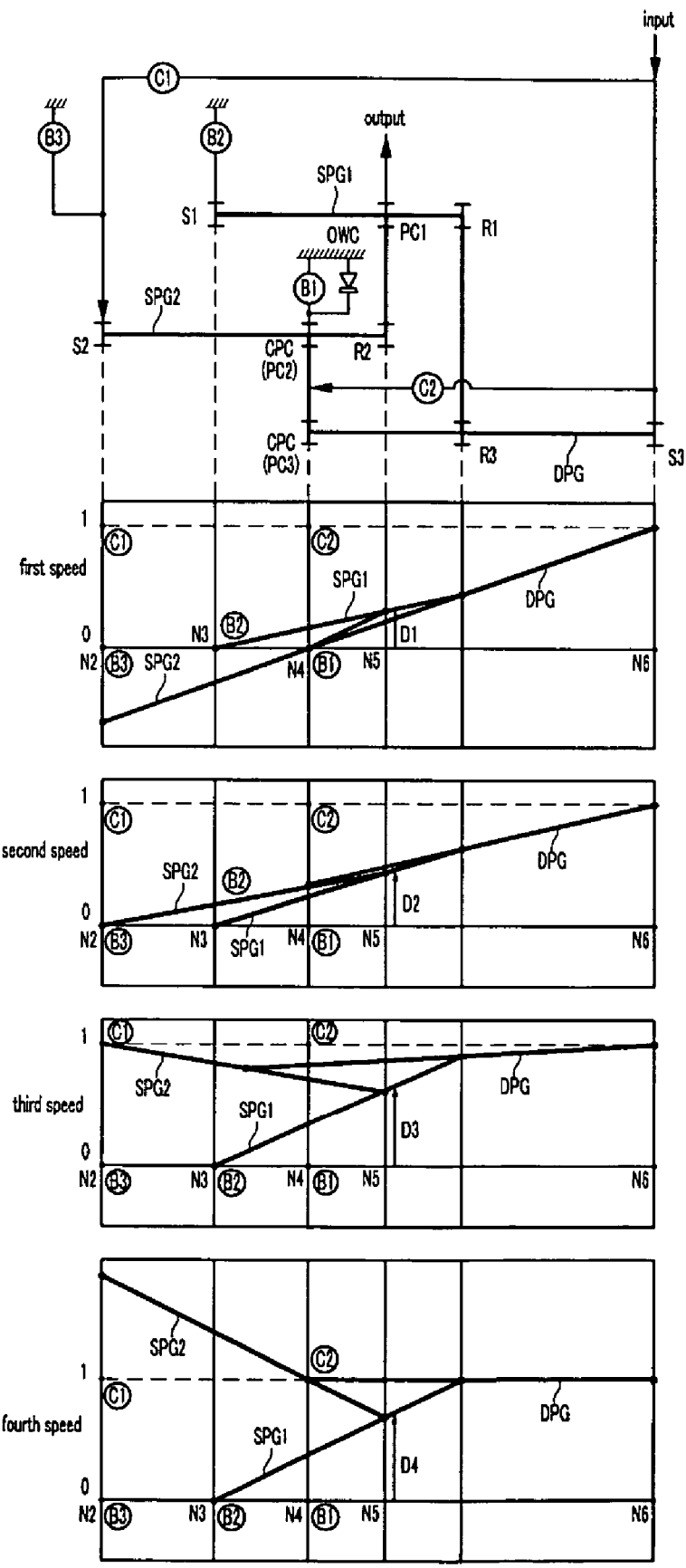
FIG. 13 and FIG. 14 are speed diagrams for first to sixth forward speeds and a reverse speed according to the seventh exemplary embodiment of the present invention.
Figure 14:
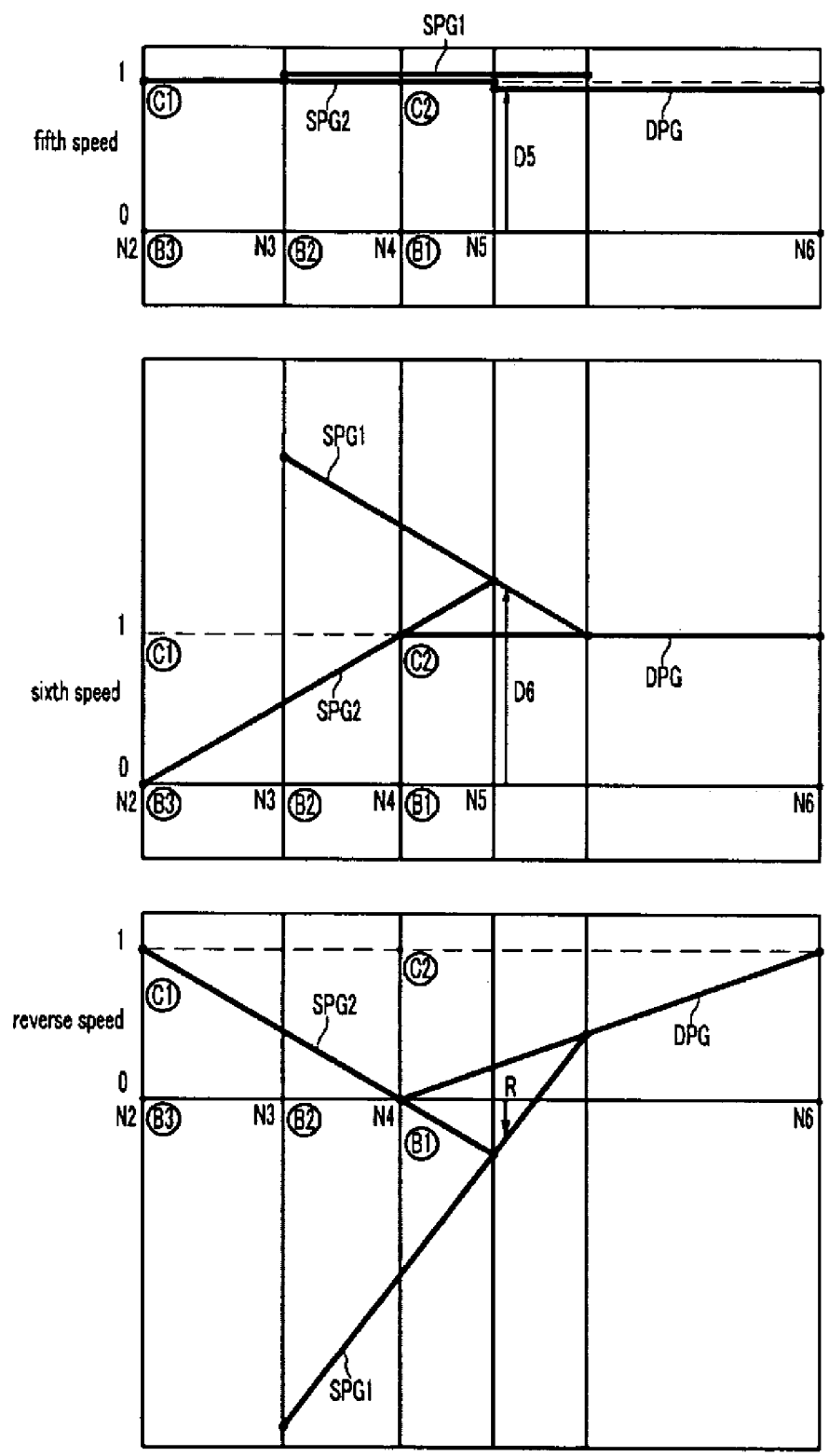

According to the seventh exemplary embodiment of the present invention, in the power delivery paths from the input shaft 3 to the first and second single pinion planetary gear sets SPG1 and SPG2 and the double pinion planetary gear set DPG using five frictional elements, the power is delivered from the input shaft 3 to the third sun gear S3, the second sun gear S2 and the third planet carrier PC3 act as variable input elements, and the first sun gear S1, the second sun gear S2, and the third planet carrier PC3 act as variable fixed elements, unlike in the first exemplary embodiment of the present invention. The shifting process for realizing six forward speeds and one reverse speed may be explained referring to the three speed lines as shown in FIG. 13 and FIG. 14. However, the operational chart as shown in FIG. 2 is referred to for explaining the shifting process according to this exemplary embodiment of the present invention, as in the first exemplary embodiment of the present invention.

FIG. 13 and FIG. 14 illustrate a shifting process of the powertrain according to a seventh exemplary embodiment of the present invention. Since in this embodiment of present invention, the interpretation method of the speed diagrams is the same as in the first exemplary embodiment of the present invention as described above, and a person of an ordinary skill in the art can easily understand the shifting process shown in FIG. 13 and FIG. 14 with reference to the description about the shifting process according to the first exemplary embodiment of the present invention described above, a more detailed description about the shifting process according to the seventh exemplary embodiment of the present invention will be omitted.

Figure 15:
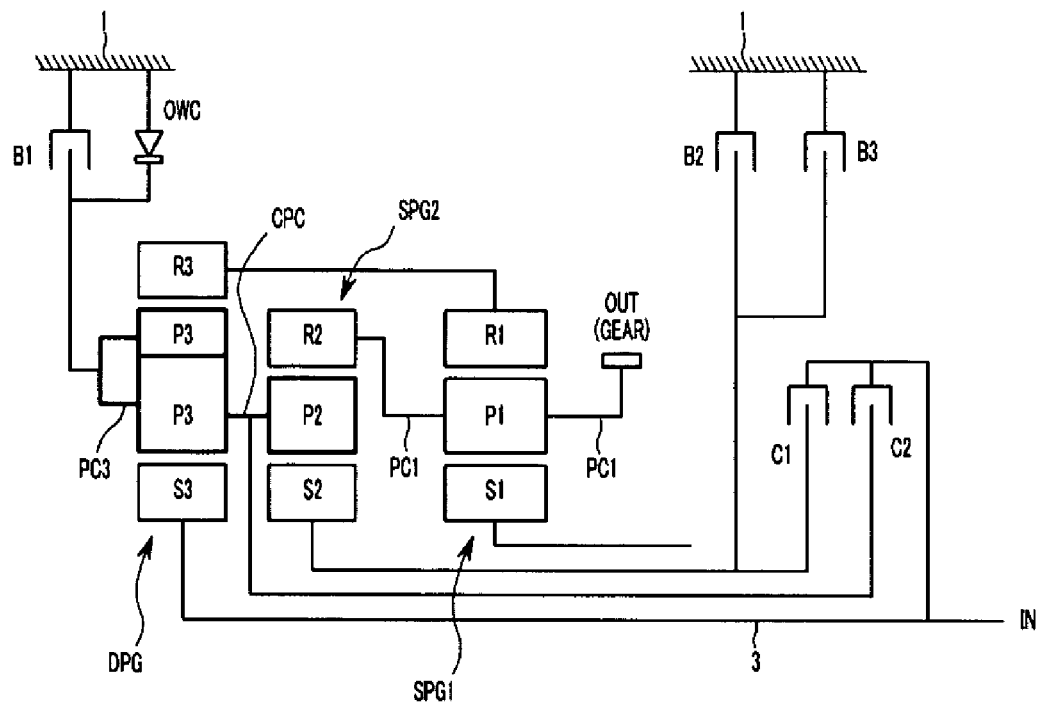
FIG. 15 is a schematic diagram of a powertrain of an automatic transmission according to an eighth exemplary embodiment of the present invention.

Hereinafter, the powertrain of an automatic transmission according to the eighth exemplary embodiment of the present invention will be described in more detail, with reference to the accompanying drawings, and in particular FIG. 15. A powertrain of an automatic transmission according to an eighth exemplary embodiment of the present invention includes a first single pinion planetary gear set SPG1 arranged on an input shaft 3 connected to an engine output via a torque converter, a second single pinion planetary gear set SPG2 arranged at the rear of the first single pinion planetary gear set SPG1, a double pinion planetary gear set DPG arranged at the rear of the second single pinion planetary gear set SPG2, and frictional elements consisting of two clutches and three brakes so as to realize the six forward speeds and one reverse speed, as in the first exemplary embodiment of the present invention.

That is, according to this embodiment of the present invention, the first single pinion planetary gear set SPG1 is disposed on the front portion of the transmission, the double pinion planetary gear set DPG is disposed on the rear portion of the transmission, and the second single pinion planetary gear set SPG2 is disposed between the first single pinion planetary gear set SPG1 and the double pinion planetary gear set DPG, as in the first exemplary embodiment of the present invention.

The first single pinion planetary gear set SPG1 includes a first sun gear S1, a first ring gear R1, and two first planet carriers PC1 rotatably supporting a first planetary gear P1 (engaged with both the first sun gear S1 and the first ring gear R1) at both sides of the first planetary gear P1.

The second single pinion planetary gear set SPG2 has a second sun gear S2, a second ring gear R2, and a second planetary gear P2 (engaged with the second sun gear S2 and the second ring gear R2). But the second single pinion planetary gear set SPG2 does not have a second planet carrier PC2.

The double pinion planetary gear set DPG includes a third sun gear S3, a third ring gear R3, and a pair of third planetary gears P3 engaged with the third sun gear S3 and the third ring gear R3. One of the pair of third planetary gears P3 is connected with the second planetary gear P2 of the second single pinion planetary gear set SPG2 via a common planet carrier CPC such that the third planetary gear P3 and the second planetary gear P2 rotate independently from each other.

In addition, the pair of third planetary gears P3 of the double pinion planetary gear set DPG are connected with a third planet carrier PC3 as well as with the common planet carrier CPC. The third planet carrier PC3 rotatably supports the pair of third planetary gears P3.

Here, the arrangement and operation of the five frictional elements is the same as in the first exemplary embodiment of the present invention where the third ring gear R3 of the double pinion planetary gear set DPG and the first ring gear R1 of the first single pinion planetary gear set SPG1 are directly and fixedly connected with each other.

In addition, the second ring gear R2 of the second single pinion planetary gear set SPG2 is fixedly connected with the corresponding first planet carrier PC1 of the first single pinion planetary gear set SPG1 as in the first exemplary embodiment of the present invention.

However, according to the first exemplary embodiment of the present invention, the second sun gear S2 of the second single pinion planetary gear set SPG2 is fixedly connected to the input shaft 3 and the first sun gear S1 of the first single pinion planetary gear set SPG1 is variably connected to the input shaft 3 via the first clutch C1. On the other hand, according to the eighth exemplary embodiment of the present invention, the third sun gear S3 of the double pinion planetary gear set DPG is fixedly connected to the input shaft 3. The second sun gear S2 is variably connected with the input shaft 3 via a first clutch C1 and acts as a variable input element, and is variably connected with the transmission case 1 via a third brake B3 and acts as a variable fixed element.

According to this exemplary embodiment of the present invention, the first sun gear S1 of the first single pinion planetary gear set SPG1 is connected with the transmission case via a second brake B2, and acts as a variable fixed element.

In addition, the third planet carrier PC3 is variably connected with the transmission case 1 via a first brake B1 and a one way clutch OWC (which are disposed in parallel) and acts as a variable fixed element, and the common planet carrier CPC is variably connected with the input shaft 3 via a second clutch C2 and acts as a variable input element, unlike in the first exemplary embodiment of the present invention.

In addition, according to the eighth exemplary embodiment of the present invention, the first planet carrier PC1 (fixedly connected with the second ring gear R2) is connected with an output gear OUT_GEAR and acts as an output element, unlike in the first exemplary embodiment of the present invention where the third ring gear R3 is connected with the output gear OUT_GEAR such that the third ring gear R3 and the first ring gear R1 act as output elements.

According to the eighth exemplary embodiment of the present invention, in the power delivery paths from the input shaft 3 to the first and second single pinion planetary gear sets SPG1 and SPG2 and the double pinion planetary gear set DPG using five frictional elements, the power is delivered from the input shaft 3 to the third sun gear S3, the second sun gear S2 and the third planet carrier PC3 act as variable input elements, and the first sun gear S1, the second sun gear S2, and the third planet carrier PC3 act as variable fixed elements, unlike in the first exemplary embodiment of the present invention. The shifting process for realizing six forward speeds and one reverse speed may be explained referring to the three speed lines as shown in FIG. 13 and FIG. 14. However, the operational chart as shown in FIG. 2 is referred to for explaining the shifting process according to this exemplary embodiment of the present invention, as in the first exemplary embodiment of the present invention.

FIG. 13 and FIG. 14 illustrate a shifting process of the powertrain according to the seventh exemplary embodiment of the present invention, but a shifting precess of the powertrain according to the eighth exemplary embodiment of the present invention can be also illustrated by FIG. 13 and FIG. 14. Since in this embodiment of present invention, the interpretation method of the speed diagrams is the same as in the first exemplary embodiment of the present invention, and a person of an ordinary skill in the art can easily understand the shifting process of the powertrain shown in FIG. 13 and FIG. 14 with reference to the description about the shifting process according to the first exemplary embodiment of the present invention as described above, a detailed description about the shifting process according to the eighth embodiment of the present invention will be omitted.

Figure 16:
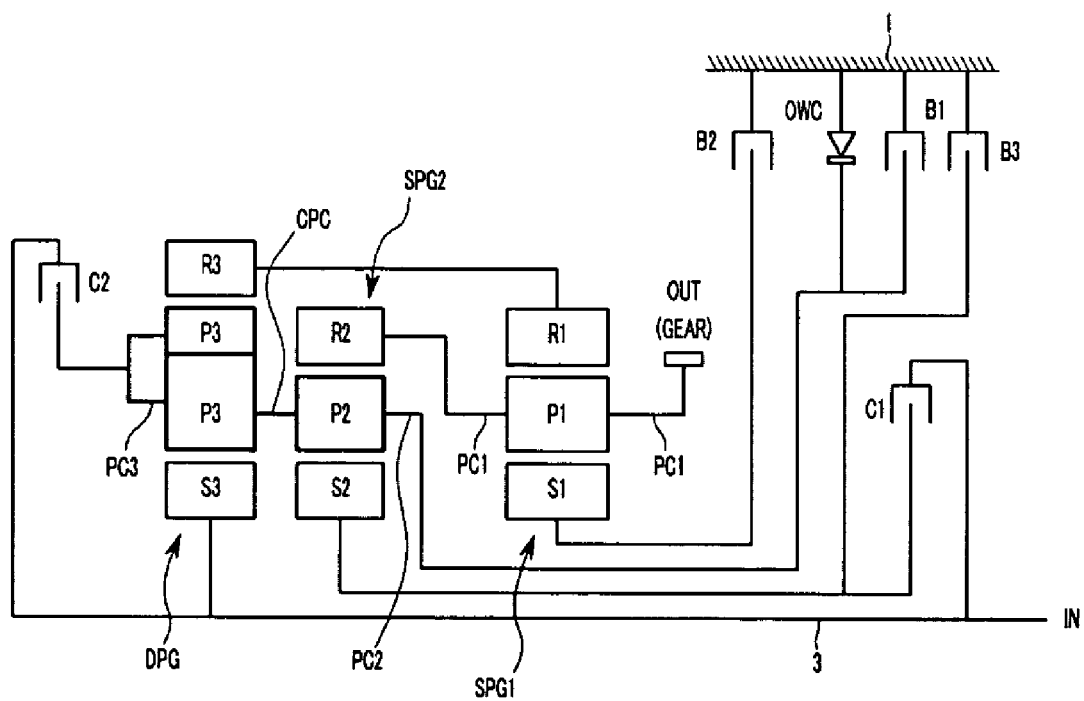
FIG. 16 is a schematic diagram of a powertrain of an automatic transmission according to a ninth exemplary embodiment of the present invention.

Hereinafter, the powertrain of an automatic transmission according to the ninth exemplary embodiment of the present invention will be described in more detail, with reference to the accompanying drawings and in particular FIG. 16. A powertrain of an automatic transmission according to a ninth exemplary embodiment of the present invention includes a first single pinion planetary gear set SPG1 arranged on an input shaft 3 connected to an engine output via a torque converter, a second single pinion planetary gear set SPG2 arranged at the rear of the first single pinion planetary gear set SPG1, a double pinion planetary gear set DPG arranged at the rear of the second single pinion planetary gear set SPG2, and frictional elements consisting of two clutches and three brakes so as to realize the six forward speeds and one reverse speed, as in the first exemplary embodiment of the present invention.

That is, according to this embodiment of the present invention, the first single pinion planetary gear set SPG1 is disposed on the front portion of the transmission, the double pinion planetary gear set DPG is disposed on the rear portion of the transmission, and the second single pinion planetary gear set SPG2 is disposed between the first single pinion planetary gear set SPG1 and the double pinion planetary gear set DPG, as in the first exemplary embodiment of the present invention.

The first single pinion planetary gear set SPG1 includes a first sun gear S1, a first ring gear R1, and two first planet carriers PC1 rotatably supporting a first planetary gear P1 (engaged with both the first sun gear S1 and the first ring gear R1) at both sides of the first planetary gear P1.

The double pinion planetary gear set DPG includes a third sun gear S3, a third ring gear R3, and a pair of third planetary gears P3 engaged with the third sun gear S3 and the third ring gear R3. One of the pair of third planetary gears P3 is connected with a second planetary gear P2 of the second single pinion planetary gear set SPG2 via a common planet carrier CPC such that the third planetary gear P3 and the second planetary gear P2 rotate independently from each other.

In addition, in the second single pinion planetary gear set SPG2, the second planetary gear P2 (engaged with both a second sun gear S2 and a second ring gear R2) is further connected with a second planet carrier PC2, as well as with the common planet carrier CPC (connected with one of the third planetary gears P3 of the double pinion planetary gear set DPG), so as to be further rotatably supported by the second planet carrier PC2.

Further in addition, the pair of third planetary gears P3 of the double pinion planetary gear set DPG are connected with a third planet carrier PC3 as well as with the common planet carrier CPC. The third planet carrier PC3 rotatably supports the pair of third planetary gears P3.

Here, the arrangement and operation of the five frictional elements is the same as in the first exemplary embodiment of the present invention where the third ring gear R3 of the double pinion planetary gear set DPG and the first ring gear R1 of the first single pinion planetary gear set SPG1 are directly and fixedly connected with each other.

In addition, the second ring gear R2 of the second single pinion planetary gear set SPG2 is fixedly connected with the corresponding first planet carrier PC1 of the first single pinion planetary gear set SPG1 as in the first exemplary embodiment of the present invention.

However, according to the first exemplary embodiment of the present invention, the second sun gear S2 of the second single pinion planetary gear set SPG2 is fixedly connected to the input shaft 3, and the first sun gear S1 of the first single pinion planetary gear set SPG1 is variably connected to the input shaft 3 via the first clutch C1. On the other hand, according to the ninth exemplary embodiment of the present invention, the third sun gear S3 of the double pinion planetary gear set DPG is fixedly connected to the input shaft 3. The second sun gear S2 is variably connected with the input shaft 3 via a first clutch C1 and acts as a variable input element, and is variably connected with the transmission case 1 via a third brake B3 and acts as a variable fixed element.

According to this exemplary embodiment of the present invention, the first sun gear S1 of the first single pinion planetary gear set SPG1 is connected with the transmission case 1 via a second brake B2, and acts as a variable fixed element, unlike in the first exemplary embodiment of the present invention.

In addition, the second planet carrier PC2 is variably connected to the transmission case 1 via a first brake B1 and an one way clutch OWC (which are disposed in parallel) and acts as a variable fixed element, and the third planet carrier PC3 is variably connected to the input shaft 3 via a second clutch C2, and acts as a variable input element, unlike in the first exemplary embodiment of the present invention.

In addition, according to the ninth exemplary embodiment of the present invention, the other first planet carrier PC1 (not the one fixedly connected with the second ring gear R2) is connected to an output gear OUT_GEAR and acts as an output element, unlike in the first exemplary embodiment of the present invention where the third ring gear R3 is connected to the output gear OUT_GEAR such that the third ring gear R3 and the first ring gear R1 act as output elements.

According to the ninth exemplary embodiment of the present invention, in the power delivery paths from the input shaft 3 to the first and second single pinion planetary gear sets SPG1 and SPG2 and the double pinion planetary gear set DPG using five frictional elements, the power is delivered from the input shaft 3 to the third sun gear S3, the second sun gear S2 and the third planet carrier PC3 act as variable input elements, and the first sun gear S1, the second sun gear S2, and the third planet carrier PC3 act as variable fixed elements, unlike in the first exemplary embodiment of the present invention. The shifting process for realizing six forward speeds and one reverse speed may be explained referring to the three speed lines as shown in FIG. 13 and FIG. 14. However, the operational chart as shown in FIG. 2 is referred to for explaining the shifting process according to this exemplary embodiment of the present invention, as in the first exemplary embodiment of the present invention.

FIG. 13 and FIG. 14 illustrate a shifting process of the powertrain according to the seventh exemplary embodiment of the present invention. Since in this embodiment of present invention, the interpretation method of the speed diagrams is the same as in the first exemplary embodiment of the present invention as described above, and a person of an ordinary skill in the art can easily understand the shifting process shown in FIG. 13 and FIG. 14 with reference to the description about shifting process according to the first exemplary embodiment of the present invention described above, a more detailed description about the shifting process according to the ninth exemplary embodiment of the present invention will be omitted.

Figure 17:
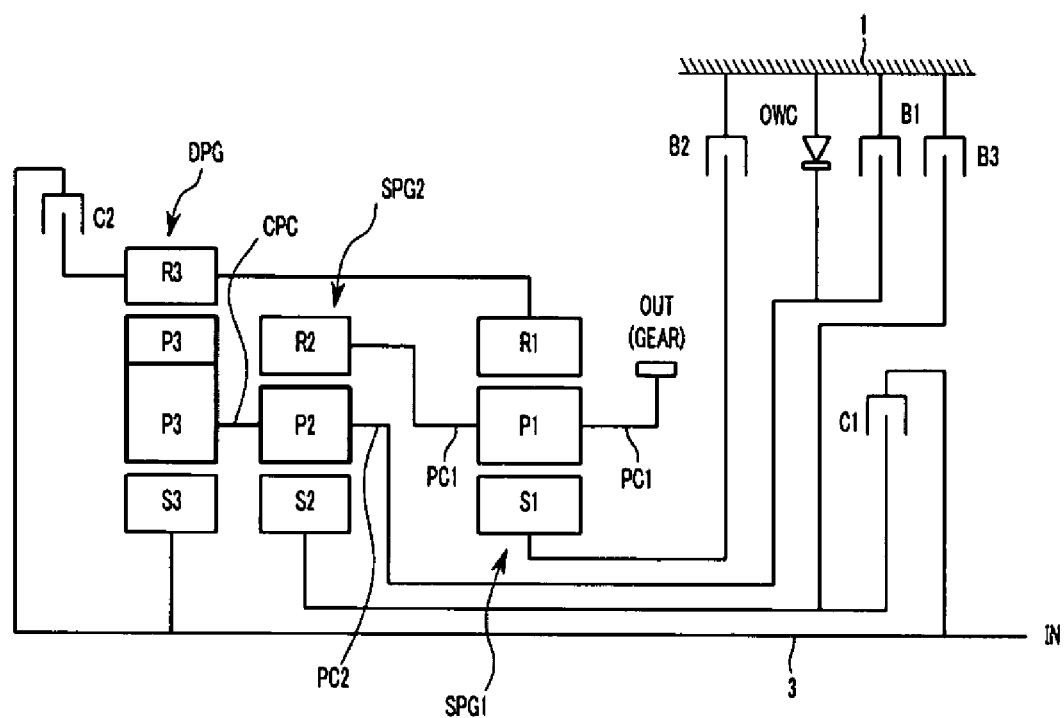
FIG. 17 is a schematic diagram of a powertrain of an automatic transmission according to a tenth exemplary embodiment of the present invention.

Hereinafter, the powertrain of an automatic transmission according to the tenth exemplary embodiment of the present invention will be described in more detail, with reference to the accompanying drawings, and in particular FIG. 17. A powertrain of an automatic transmission according to a tenth exemplary embodiment of the present invention includes a first single pinion planetary gear set SPG1 arranged on an input shaft 3 connected to an engine output via a torque converter, a second single pinion planetary gear set SPG2 arranged at the rear of the first single pinion planetary gear set SPG1, a double pinion planetary gear set DPG arranged on the rear of the second single pinion planetary gear set SPG2, and frictional elements consisting of two clutches and three brakes so as to realize the six forward speeds and one reverse speed, as in the first exemplary embodiment of the present invention.

That is, according to this embodiment of the present invention, the first single pinion planetary gear set SPG1 is disposed on the front portion of the transmission, the double pinion planetary gear set DPG is disposed on the rear portion of the transmission, and the second single pinion planetary gear set SPG2 is disposed between the first single pinion planetary gear set SPG1 and the double pinion planetary gear set DPG, as in the first exemplary embodiment of the present invention.

The first single pinion planetary gear set SPG1 includes a first sun gear S1, a first ring gear R1, and two first planet carriers PC1 rotatably supporting a first planetary gear P1 (engaged with both the first sun gear S1 and the first ring gear R1) at both sides of the first planetary gear P1.

The double pinion planetary gear set DPG includes a third sun gear S3, a third ring gear R3, and a pair of third planetary gears P3 engaged with the third sun gear S3 and the third ring gear R3. One of the pair of third planetary gears P3 is connected with a second planetary gear P2 of the second single pinion planetary gear set SPG2 via a common planet carrier CPC such that the third planetary gear P3 and the second planetary gear P2 rotate independently from each other.

In addition, in the second single pinion planetary gear set SPG2, the second planetary gear P2 (engaged with both a second sun gear S2 and a second ring gear R2) is rotatably carried by a second planet carrier PC2 as well as by the common planet carrier CPC (connected with one of the third pinion planetary gears P3 of the double pinion planetary gear set DPG).

Here, the arrangement and operation of the five frictional elements is the same as in the first exemplary embodiment of the present invention where the third ring gear R3 of the double pinion planetary gear set DPG and the first ring gear R1 of the first single pinion planetary gear set SPG1 are directly and fixedly connected with each other.

In addition, the second ring gear R2 of the second single pinion planetary gear set SPG2 is fixedly connected with the corresponding first planet carrier PC1 of the first single pinion planetary gear set SPG1 as in the first exemplary embodiment of the present invention.

However, according to the first exemplary embodiment of the present invention, the second sun gear S2 of the second single pinion planetary gear set SPG2 is fixedly connected to the input shaft 3, and the first sun gear S1 of the first single pinion planetary gear set SPG1 is variably connected to the input shaft 3 via the first clutch C1. On the other hand, according to the tenth exemplary embodiment of the present invention, the third sun gear S3 of the double pinion planetary gear set DPG is fixedly connected to the input shaft 3 and the second sun gear S2 is variably connected with the input shaft 3 via the first clutch C1 and acts as a variable input element, and is variably connected with the transmission case 1 via the third brake B3 and acts as a variable fixed element.

According to this exemplary embodiment of the present invention, the first sun gear S1 of the first single pinion planetary gear set SPG1 is connected with the transmission case with a second brake B2, and acts as a variable fixed element, unlike in the first exemplary embodiment of the present invention.

In addition, the second planet carrier PC2 is variably connected to the transmission case 1 via a first brake B1 and an one way clutch OWC (which are disposed in parallel) and acts as a variable fixed element, and the third ring gear R3 is variably connected to the input shaft 3 via a second clutch C2 and acts as a variable input element, unlike in the first exemplary embodiment.

In addition, according to the tenth exemplary embodiment of the present invention, the other first planet carrier PC1 (not the one fixedly connected with the second ring gear R2) is connected with an output gear OUT_GEAR and acts as an output element, unlike in the first exemplary embodiment of the present invention where the third ring gear R3 is connected with the output gear OUT_GEAR such that the third ring gear R3 and the first ring gear R1 act as output elements.

Figure 18:
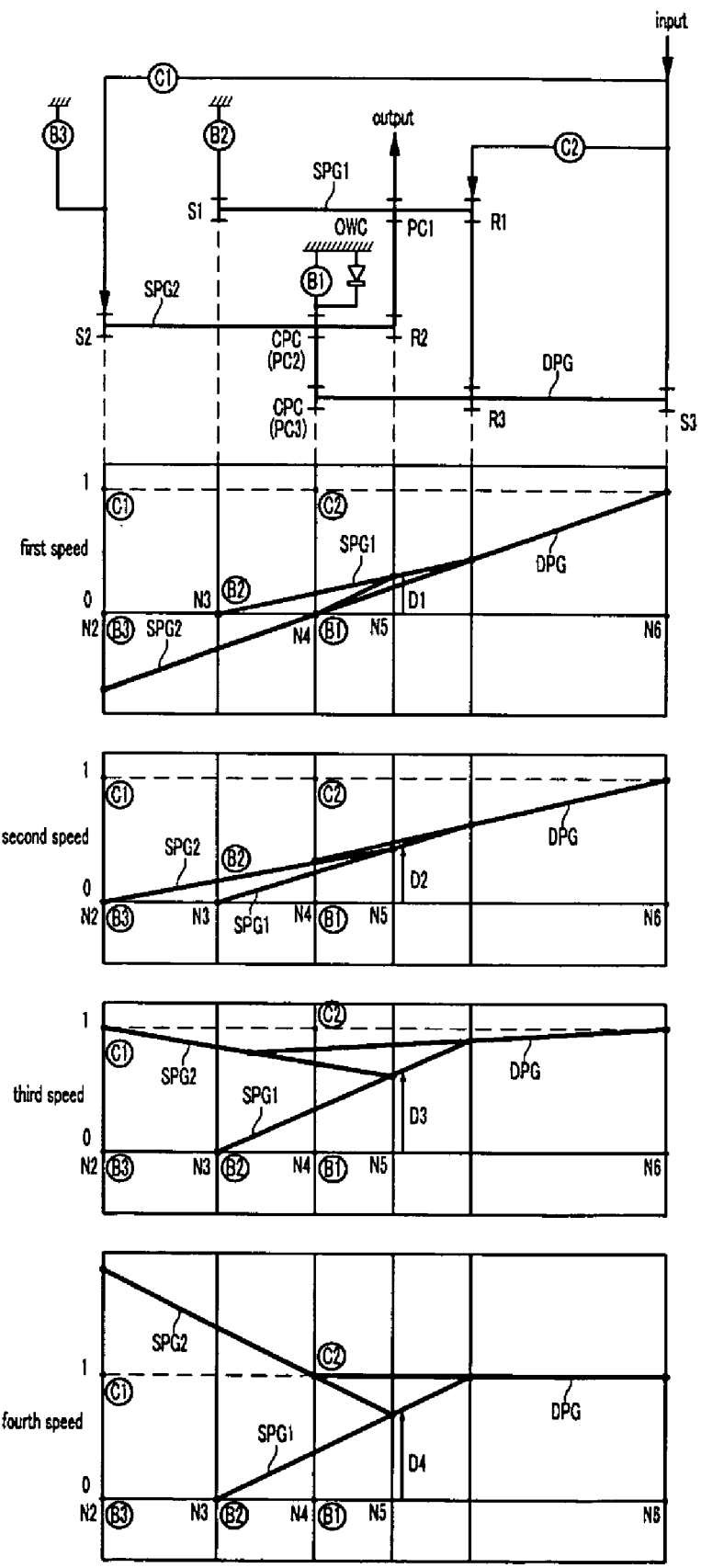
FIG. 18 is a speed diagram for first to fourth forward speeds of a powertrain of an automatic diagram according to the tenth embodiment of the present invention.
Figure 19:
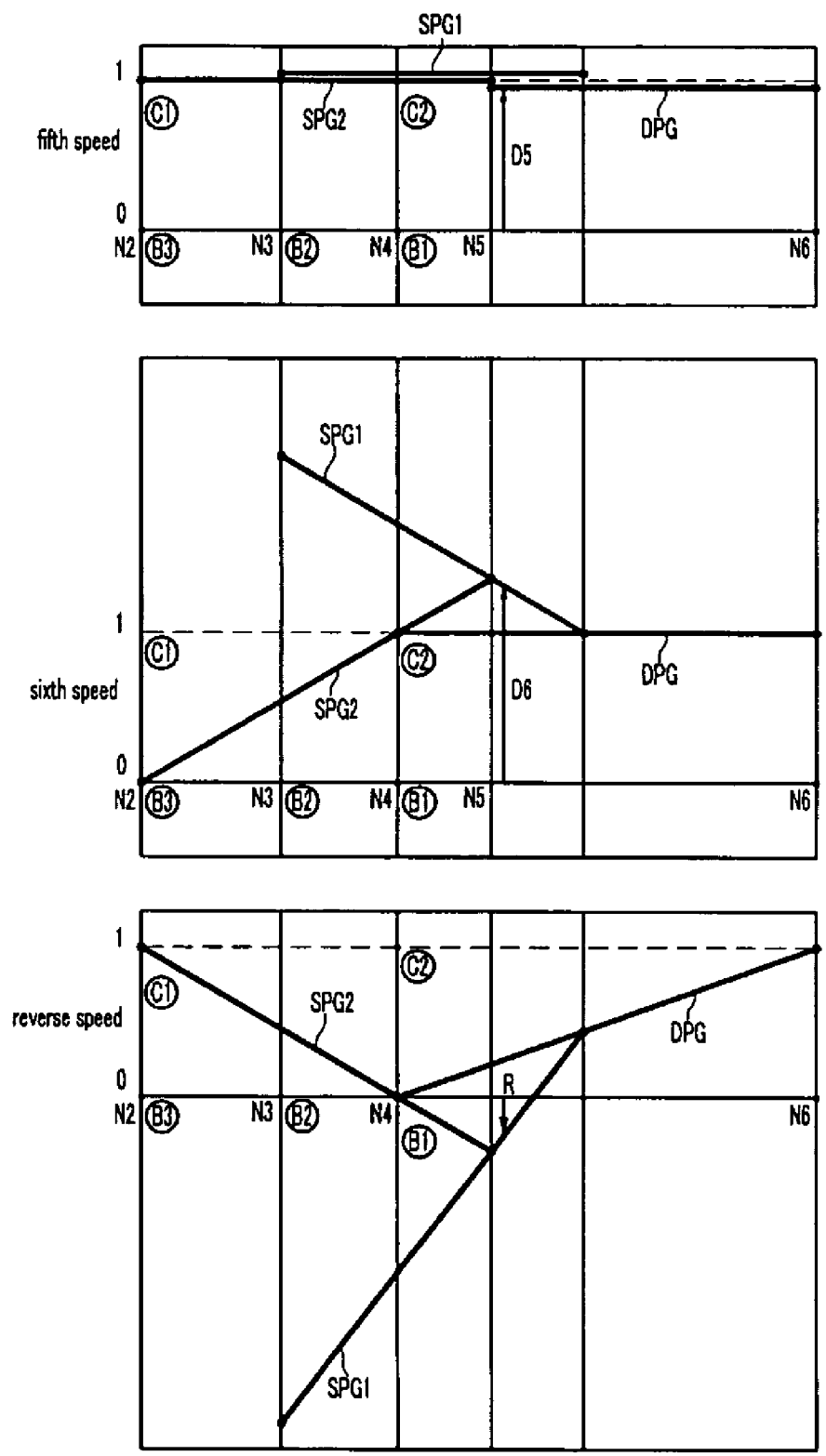
FIG. 19 is a speed diagram for fifth and sixth forward speeds and a reverse speed of a powertrain of an automatic transmission according to the tenth embodiment of the present invention.

According to the tenth exemplary embodiment of the present invention, in the power delivery paths from the input shaft 3 to the first and second single pinion planetary gear sets SPG1 and SPG2 and the double pinion planetary gear set DPG using five frictional elements the power is delivered from the input shaft 3 to the third sun gear S3, the second sun gear S2 and the third planet carrier PC3 act as variable input elements, and the first sun gear S1, the second sun gear S2, and the third planet carrier PC3 act as variable fixed elements, unlike in the first exemplary embodiment of the present invention. The shifting process for realizing six forward speeds and one reverse speed may be explained referring to the three speed lines as shown in FIG. 18 and FIG. 19. However, the operational chart as shown in FIG. 2 is referred to for explaining the shifting process according to this exemplary embodiment of the present invention, as in the first exemplary embodiment of the present invention.

FIG. 18 and FIG. 19 illustrate a shifting process of the powertrain according to the tenth exemplary embodiment of the present invention. Since in this embodiment of present invention, the interpretation method of the speed diagrams is the same as in the first exemplary embodiment of the present invention as described above, and a person of an ordinary skill in the art can easily understand the shifting process shown in FIG. 18 and FIG. 19 with reference to the description about the shifting process according to the first exemplary embodiment of the present invention described above, a more detailed description about the shifting process according to the tenth exemplary embodiment of the present invention will be omitted.

Since analyzing the above-mentioned speed lines about respective planetary gear sets is obvious for a person of an ordinary skill in the art, except for the description regarding the first exemplary embodiment of the present invention, a detailed description about the second to tenth exemplary embodiments of the present invention has been omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, the powertrain according to the present invention includes first and second single pinion planetary gear sets and a double pinion planetary gear set. One planetary gear of the double pinion planetary gear set and one planetary gear of the second single pinion planetary gear set are connected with each other so as to rotate independently, and at least two ring gears are connected as an integral form, such that an axial supporting structure is excluded, and the length and weight of the transmission can be minimized.

In addition, since an output gear (OUT_GEAR) is connected with a ring gear (or with a planet carrier fixedly connected with a ring gear) operational torque can be stabilized and durability of the planet carrier can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A six-speed powertrain of an automatic transmission comprising first, second, and third planetary gear sets, an input shaft, and a transmission case, wherein:
   the first planetary gear set is a first single pinion planetary gear set, the second planetary gear set is a second single pinion planetary gear set, and the third planetary gear set is a double pinion planetary gear set;
   the first single pinion planetary gear set has a first sun gear, two first planet carriers, a first planetary gear, and a first ring gear;
   the second single pinion planetary gear set has a second sun gear, a second planetary gear, and a second ring gear;
   the double pinion planetary gear set is disposed adjacent to the second single pinion planetary gear set and has a third sun gear, a pair of third planetary gears, and a third ring gear;
   one planetary gear of the pair of third planetary gears and the second planetary gear are commonly connected by a common planet carrier such that the second and third planetary gears may independently rotate;
   the third ring gear and the first ring gear are fixedly connected such that they are integrally formed;
   the second ring gear and one first planet carrier are fixedly connected; and
   a torque of the input shaft is always transmitted to the second sun gear or the third sun gear.

2. The powertrain of claim 1, wherein:
   the first sun gear is variably connected with the input shaft via a clutch;
   the one first planet carrier and the second ring gear are variably connected with the input shaft via a clutch;
   the other first planet carrier is variably connected with the transmission case via a brake and a one-way clutch disposed in parallel;
   the third sun gear is variably connected with the transmission case via a brake;
   the first sun gear is variably connected with the transmission case via a brake;
   the second sun gear is fixedly connected with the input shaft; and
   the third ring gear is fixedly connected with the first ring gear and they act as output elements.

3. The powertrain of claim 2, wherein an output gear is connected to the third ring gear acting as an output element.

4. The powertrain of claim 2, wherein an output gear is connected to the first ring gear acting as an output element.

5. The powertrain of claim 1, wherein
   the first sun gear is variably connected with the input shaft via a clutch;
   a second planet carrier is additionally included in the second single pinion planetary gear set and is variably connected with the input shaft via a clutch;
   the other first planet carrier is variably connected with the transmission case via a brake and a one way clutch disposed in parallel;
   the third sun gear is variably connected with the transmission case via a brake;
   the first sun gear is variably connected with the transmission case via a brake;
   the second sun gear is fixedly connected with the input shaft; and
   the third ring gear is fixedly connected with the first ring gear and they act as output elements.

6. The powertrain of claim 5, wherein the third ring gear acting as an output element is connected with an output gear.

7. The powertrain of claim 5, wherein the first ring gear acting as an output element is connected with an output gear.

8. The powertrain of claim 1, wherein:
   the first sun gear is variably connected with the input shaft via a clutch;

the common planet carrier commonly connecting the second single pinion planatery gear set and the double pinion planatery gear set is variably connected with the input shaft via a clutch;

the other first planet carrier is variably connected with the transmission case via a brake and a one-way clutch disposed in parallel;

the third sun gear is variably connected with the transmission case via a brake;

the first sun gear is variably connected with the transmission case via a brake;

the second sun gear is fixedly connected with the input shaft; and the third ring gear is fixedly connected with the first ring gear and they act as output elements.

9. The powertrain of claim 8, wherein the third ring gear is connected with an output gear and acts as an output element.

10. The powertrain of claim 8, wherein the first ring gear is connected with an output gear and acts as an output element.

11. The powertrain of claim 1, wherein:
the second sun gear is variably connected with the input shaft via a clutch;
a third planet carrier is additionally included in the double pinion planetary gear set and is variably connected with the input shaft via a clutch;
the third planet carrier is variably connected with the transmission case via a brake and an one-way clutch disposed in parallel;
the first sun gear is variably connected with the transmission case via a brake;
the second sun gear is variably connected with the transmission case via a brake;
the third sun gear is fixedly connected with the input shaft; and
the other first planet carrier acts as an output element.

12. The powertrain of claim 1, wherein:
the second sun gear is variably connected with the input shaft via a clutch;
the common planet carrier is variably connected with the input shaft via a clutch;
a third planet carrier is additionally included in the double pinion planetary gear set and is variably connected with the transmission case via a brake and an one way clutch disposed in parallel;
the first sun gear is variably connected with the transmission case via a brake;
the second sun gear is variably connected with the transmission case via a brake;
the third sun gear is fixedly connected with the input shaft; and
the other first planet carrier acts as an output element.

13. The powertrain of claim 1, wherein:
the second sun gear is variably connected with the input shaft via a clutch;
a third planet carrier is additionally included in the double pinion planetary gear set and is variably connected with the input shaft via a clutch;
a second planet carrier is additionally included in the second single pinion planetary gear set, separately formed from the second planetary gear, and is variably connected with the transmission case via a brake and an one way clutch disposed in parallel;
the first sun gear is variably connected with the transmission case via a brake;

the second sun gear is variably connected with the transmission case via a brake;
the third sun gear is fixedly connected with the input shaft; and
the other first planet carrier acts as an output element.

14. The powertrain of claim 1, wherein:
the second sun gear is variably connected with the input shaft via a clutch;
the third ring gear is variably connected with the input shaft via a clutch;
a second planet carrier is additionally included in the second single pinion planetary gear set, separately formed from the second planetary gear, and is variably connected with the transmission case via a brake and an one way clutch disposed in parallel;
the first sun gear is variably connected with the transmission case via a brake;
the second sun gear is variably connected with the transmission case via a brake;
the third sun gear is fixedly connected with the input shaft; and
the other first planet carrier acts as an output element.

15. The powertrain of any one of claim 11 to claim 14, wherein
the first planet carrier acting as an output element is connected with an output gear.

16. A six-speed powertrain of an automatic transmission comprising first, second, and third planetary gear sets, an input shaft, and a transmission case, wherein:
the first planetary gear set is a first single pinion planetary gear set, the second planetary gear set is a second single pinion planetary gear set, and the third planetary gear set is a double pinion planetary gear set;
the first single pinion planetary gear set has a first sun gear, two first planet carriers, a first planetary gear, and a first ring gear;
the second single pinion planetary gear set has a second sun gear, a second planetary gear, and a second ring gear;
the double pinion planetary gear set is disposed adjacent to the second planetary gear set and has a third sun gear, a pair of third planetary gears, and a third ring gear;
one planetary gear of the pair of third planetary gears and the second planetary gear are commonly connected by a common planet carrier such that the second and third planetary gears may independently rotate;
the third ring gear and the first ring gear are fixedly connected such that they are integrally formed;
the second ring gear and one first planet carrier are fixedly connected;
a torque of the input shaft is always transmitted to the third sun gear or the second sun gear; and
frictional elements consisting of two clutches and three brakes are operated to realize six forward speeds and one reverse speed.

17. The powertrain of claim 16, wherein:
the first sun gear is variably connected with the input shaft via a first clutch;
the one first planet carrier and the second ring gear are variably connected with the input shaft via a second clutch;
the other first planet carrier is variably connected with the transmission case via a first brake and a one-way clutch disposed in parallel;
the third sun gear is variably connected with the transmission case via a second brake;

the first sun gear is variably connected with the transmission case via a third brake;
the second sun gear is fixedly connected with the input shaft; and
the third ring gear is fixedly connected with the first ring gear and they act as output elements.

18. The powertrain of claim 17, wherein
the third ring gear is connected with an output gear and acts as an output element.

19. The powertrain of claim 17, wherein
the first ring gear is connected with an output gear and acts as an output element.

20. The powertrain of claim 16, wherein:
the first sun gear is variably connected with the input shaft via a first clutch;
a second planet carrier is additionally included in the second single pinion planetary gear set and is variably connected with the input shaft via a second clutch;
the other first planet carrier is variably connected with the transmission case via a first brake and a one way clutch disposed in parallel;
the third sun gear is variably connected with the transmission case via a second brake;
the first sun gear is variably connected with the transmission case via a third brake;
the second sun gear is fixedly connected with the input shaft; and
the third ring gear is fixedly connected with the first ring gear and they act as output elements.

21. The powertrain of claim 20, wherein:
the third ring gear is connected with the output gear and acts as an output element.

22. The powertrain of claim 20, wherein:
the first ring gear is connected with the output gear and acts as an output element.

23. The powertrain of claim 16, wherein
the first sun gear is variably connected with the input shaft via a first clutch;
the common planet carrier is variably connected with the input shaft via a second clutch;
the other first planet carrier is variably connected with the transmission case via a first brake and a one-way clutch disposed in parallel;
the third sun gear is variably connected with the transmission case via a second brake;
the first sun gear is variably connected with the transmission case via a third brake;
the second sun gear is fixedly connected with the input shaft; and
the third ring gear is fixedly connected with the first ring gear and they act as output elements.

24. The powertrain of claim 23, wherein:
the third ring gear is connected with the output gear and acts as an output element.

25. The powertrain of claim 23, wherein:
the first ring gear is connected with the output gear and acts as an output element.

26. The powertrain of claim 16, wherein:
the second sun gear is variably connected with the input shaft via a first clutch;
a third planet carrier is additionally included in the double pinion planetary gear set and is variably connected with the input shaft via a second clutch;
the third planet carrier is also variably connected with the transmission case via a first brake and an one-way clutch disposed in parallel;
the first sun gear is variably connected with the transmission case via a second brake;
the second sun gear is variably connected with the transmission case via a third brake;
the third sun gear is fixedly connected with the input shaft; and
the other first planet carrier acts as an output element.

27. The powertrain of claim 16, wherein:
the second sun gear is variably connected with the input shaft via a first clutch;
the common planet carrier being commonly connected with the second single pinion planetary gear set and the double pinion planetary gear set is variably connected with the input shaft via a second clutch;
a third planet carrier is additionally included in the double pinion planetary gear set and is variably connected with the transmission case via a first brake and an one way clutch disposed in parallel;
the first sun gear is variably connected with the transmission case via a second brake;
the second sun gear is variably connected with the transmission case via a third brake;
the third sun gear is fixedly connected with the input shaft; and
the other first planet carrier acts as an output element.

28. The powertrain of claim 16, wherein:
the second sun gear is variably connected with the input shaft via a first clutch;
a third planet carrier is additionally included in the double pinion planetary gear set and is variably connected with the input shaft via a second clutch;
a second planet carrier is additionally included in the second single pinion planetary gear set, separately formed from the second planetary gear, and is variably connected with the transmission case via a first brake and an one way clutch disposed in parallel;
the first sun gear is variably connected with the transmission case via a second brake;
the second sun gear is variably connected with the transmission case via a third brake;
the third sun gear is fixedly connected with the input shaft; and
the other first planet carrier acts as an output element.

29. The powertrain of claim 16, wherein:
the second sun gear is variably connected with the input shaft via a first clutch;
the third ring gear is variably connected with the input shaft via a second clutch;
a second planet carrier is additionally included in the second single pinion planetary gear set, separately formed from the second planetary gear, and is variably connected with the transmission case via a first brake and an one way clutch disposed in parallel;
the first sun gear is variably connected with the transmission case via a second brake;
the second sun gear is variably connected with the transmission case via a third brake;
the third sun gear is fixedly connected with the input shaft; and
the other first planet carrier acts as an output element.

30. The powertrain of any one of claim 26 to claim 29, wherein:
the first planet carrier acting as an output element is connected with an output gear.

31. The powertrain of any one of claim 17, claim 20, claim 23, and claim 26 to claim 29, wherein:

the second brake and the one-way clutch are operated for a first forward speed;

the one-way clutch is released and the third brake is operated for a second forward speed from the first forward speed;

the third brake is released and the first clutch is operated for a third forward speed from the second forward speed;

the first clutch is released and the second clutch is operated for a fourth forward speed from the third forward speed;

the second brake is released and the first clutch is operated for a fifth forward speed from the fourth forward speed;

the first clutch is released and the third brake is operated for a sixth forward speed from the fifth forward speed; and the first clutch and the first brake are operated for a reverse speed.

* * * * *